(12) United States Patent
van Thiel et al.

(10) Patent No.: US 12,715,410 B2
(45) Date of Patent: Aug. 25, 2026

(54) COMPRESSED-AIR SUPPLY ARRANGEMENT OF A PNEUMATIC BRAKE SYSTEM, AND METHOD FOR ENGAGING A PARKING BRAKE BY LIMITING THE DELIVERY RATE

(71) Applicant: ZF CV Systems Global GmbH, Bern (CH)

(72) Inventors: Julian van Thiel, Grossburgwedel (DE); Robert Otremba, Ronnenberg (DE); Arne Michaelsen, Seelze (DE)

(73) Assignee: ZF CV Systems Global GmbH, Bern (CH)

( * ) Notice: Subject to any disclaimer, the term of this patent is extended or adjusted under 35 U.S.C. 154(b) by 67 days.

(21) Appl. No.: 19/000,224

(22) Filed: Dec. 23, 2024

(65) Prior Publication Data

US 2025/0206284 A1 Jun. 26, 2025

(30) Foreign Application Priority Data

Dec. 22, 2023 (DE) ..................... 10 2023 136 452.9

(51) Int. Cl.
*B60T 13/68* (2006.01)
*B60T 13/38* (2006.01)

(52) U.S. Cl.
CPC .......... *B60T 13/683* (2013.01); *B60T 13/385* (2013.01); *B60T 2270/403* (2013.01); *B60T 2270/413* (2013.01)

(58) Field of Classification Search
CPC ................ B60T 13/683; B60T 13/385; B60T 2270/403; B60T 2270/413; B60T 13/26;
(Continued)

(56) References Cited

U.S. PATENT DOCUMENTS 6,089,831 A 7/2000 Bruehmann et al.
2008/0040013 A1 2/2008 Detlefs et al.
(Continued)

FOREIGN PATENT DOCUMENTS

DE 195 15 895 A1 10/1996
DE 198 34 701 A1 2/2000
(Continued)

*Primary Examiner* — Yi-Kai Wang
(74) *Attorney, Agent, or Firm* — Walter Ottesen, P.A.

(57) ABSTRACT

A compressed-air supply arrangement is for supplying compressed air to an electronically controllable pneumatic brake system of a utility vehicle. An electronically controllable pneumatic brake system includes such a compressed-air supply arrangement. A corresponding utility vehicle includes such a braking system. A method is for engaging a parking brake in the event of a fault of an electronically controllable pneumatic brake system of a utility vehicle. The compressed-air supply arrangement includes a compressor, an air treatment unit, at least one compressed-air reservoir for providing a reservoir pressure, and a delivery-rate limiting device, having a switchable valve unit, for limiting the compressed-air flow delivered by the compressor to the at least one compressed-air reservoir. The switchable valve unit is switched, in the event of a fault of the brake system, via a switching signal received from an electronic brake control unit of the brake system.

21 Claims, 7 Drawing Sheets

(58) Field of Classification Search
CPC ...... B60T 13/662; B60T 15/041; B60T 17/02; B60T 17/22
USPC ........................................................... 701/70
See application file for complete search history.

(56) References Cited

U.S. PATENT DOCUMENTS

| | | | | |
|---|---|---|---|---|
| 2010/0025141 | A1 | 2/2010 | Bensch et al. | |
| 2017/0072930 | A1 | 3/2017 | Leinung et al. | |
| 2022/0219665 | A1* | 7/2022 | Zhang | B60T 13/142 |
| 2023/0311828 | A1 | 10/2023 | van Thiel | |
| 2024/0182011 | A1 | 6/2024 | van Thiel | |
| 2024/0198991 | A1 | 6/2024 | van Thiel | |
| 2024/0246520 | A1 | 7/2024 | van Thiel | |
| 2024/0300465 | A1 | 9/2024 | van Thiel | |
| 2024/0359676 | A1* | 10/2024 | Jang | B60T 13/745 |
| 2024/0375628 | A1 | 11/2024 | van Thiel | |
| 2025/0001987 | A1* | 1/2025 | Leiber | B60T 8/1755 |

FOREIGN PATENT DOCUMENTS

| | | | |
|---|---|---|---|
| DE | 100 04 091 | A1 | 8/2001 |
| DE | 10 2015 106 144 | A1 | 10/2016 |
| DE | 10 2020 132 875 | A1 | 6/2022 |
| DE | 10 2021 122 497 | A1 | 3/2023 |
| DE | 10 2021 122 498 | A1 | 3/2023 |
| DE | 10 2021 122 499 | A1 | 3/2023 |
| DE | 10 2021 131 328 | A1 | 6/2023 |
| DE | 10 2022 101 142 | A1 | 7/2023 |
| EP | 2 108 557 | A2 | 10/2009 |
| EP | 1 968 830 | B1 | 3/2010 |
| EP | 3 031 683 | A1 | 6/2016 |
| EP | 2 754 594 | B1 | 7/2016 |
| EP | 3 145 769 | B1 | 3/2018 |
| WO | 2005/014360 | A1 | 2/2005 |

* cited by examiner

COMPRESSED-AIR SUPPLY ARRANGEMENT OF A PNEUMATIC BRAKE SYSTEM, AND METHOD FOR ENGAGING A PARKING BRAKE BY LIMITING THE DELIVERY RATE

CROSS-REFERENCE TO RELATED APPLICATIONS

This application claims priority of German patent application no. 10 2023 136 452.9, filed Dec. 22, 2023, the entire content of which is incorporated herein by reference.

TECHNICAL FIELD

The disclosure relates to a compressed-air supply arrangement for supplying compressed air to an electronically controllable pneumatic brake system of a utility vehicle, and also relates to an electronically controllable pneumatic brake system having such a compressed-air supply arrangement, to a method for engaging a parking brake in the event of a fault of an electronically controllable pneumatic brake system of a utility vehicle, and to a corresponding utility vehicle.

BACKGROUND

Modern utility vehicles commonly have an electronically controllable pneumatic brake system. The brake system generally includes spring brakes as parking brakes, also referred to as immobilizing brakes. The parking brakes operate under the action of spring force, can be released by pressurization of spring brake cylinders with a parking brake pressure, and can be arrested by ventilation. Valves within a service brake system are electronically controlled in order to control a service brake pressure. The valves may be provided in, or outside, so-called axle modulators. The axle modulators may be automated or partially automated, and/or may be electronically controllable by an autonomous unit. The parking brakes are also electronically controlled. For example, the pressurization or ventilation of the spring brake cylinders can be controlled by actuation of a solenoid valve. The spring brake cylinders may be combined with service brake cylinders, such that the spring brake and service brake act on the same brake pistons. Suitable configuration measures may be implemented in order to avoid mechanical overloading of the brake pistons as a result of summation of braking forces from the service brakes and the spring brakes. If the service brakes are actuated whilst the parking brakes are active, the spring brake cylinders are simultaneously pressurized in order to thus avoid summation of the braking forces. Such a function is also referred to as an "anti-compound function".

In some markets, for safety reasons, the spring brake cylinders are ventilated if the reservoir pressure in the service brake system falls. Here, the service brake and parking brake may also be assigned to different brake circuits. In the case of assignment to different brake circuits, it is ensured, in part by way of a so-called "bleed back function", that a drop in the reservoir pressure in the brake circuit for the service brake also causes the brake circuit for the spring brake to be ventilated. In some countries, it is not necessary for the service brake and parking brake to have separate brake circuits. The brake circuit for the parking brake is then simultaneously the brake circuit for the service brake, such that the spring brake cylinders are ventilated in any case in the event of a drop in the reservoir pressure in the brake circuit.

It must be possible for the parking brake to be engaged by a driver of the vehicle. In some markets, this is performed by way of an electronic parking brake demand to the parking brake device. In the event of a fault, the driver is required to ventilate the spring brake cylinders, and thus activate the parking brake, by intentionally lowering the reservoir pressure in the brake circuit for the service brake. For this purpose, the driver brakes the vehicle using the service brake, switches off the engine such that the delivery of compressed air is stopped, and thereafter repeatedly actuates the service brake. The brake circuit for the service brake is thus gradually ventilated. The spring brake cylinders are consequently also ventilated. The discussed procedure requires attentiveness on the part of, and timely intervention by, the driver.

Safety concepts are of high relevance in electropneumatic brake systems for modern vehicles. In particular in vehicles with highly automated or partially automated driving functions, braking functions must remain available at least to a restricted degree even in the event of a fault of the brake system, such as a software malfunction, a hardware fault (for example as a result of failure or damage) or an electrical failure of a control unit. Only in this way can the safety of the vehicle, its occupants and other road users be ensured. For this purpose, it is known to provide redundancy levels that can continue to provide an at least restricted braking function even in the event of failure of a primary system.

For example, it is known to use the parking brake as an auxiliary brake or additional brake in situations in which a fault has occurred in the service brake system. Aside from the service brakes, a redundancy level is also desired for the parking brake, because in most cases, vehicles can be safely parked only with the parking brake engaged. To enhance functionality, and in particular to be able to pressurize and thus release the corresponding spring brake cylinders of the parking brake irrespective of the occurrence of a fault in any of the various levels, be it the operational level or a redundancy level of the brake system, it is desirable for the spring brake cylinders to be capable of being controlled via two independent paths. This is intended to increase functionality, operational readiness of the vehicle, and in particular safety. Through the provision of a redundancy level, it is thus possible to ensure that the vehicle can be safely parked even in the event of one or more faults in the brake system.

DE 10 2021 122 497 A1 has disclosed a method for operating an electropneumatic brake system for a vehicle, wherein the brake system includes a service brake system and a parking brake system. The parking brake system includes at least one spring brake cylinder. The method is characterized by the steps: providing, via a control unit, a control signal for maintaining a spring accumulator pressurization pressure with which the at least one spring brake cylinder is pressurized; stopping the provision of the control signal in the event of a fault and/or an electrical failure and/or in a diagnostic situation of the control unit; thus automatically ending the maintaining of the spring accumulator pressurization pressure in order to ventilate the at least one spring brake cylinder; thus triggering a spring accumulator failure braking operation of the vehicle via the parking brake system, with the spring accumulator pressurization pressure being vented by way of a service brake ventilation function of the service brake system. The service brake ventilation function makes it possible to realize at least one, in particular continuously or intermittently opened, ventilation path in the service brake system for the the purposes of ventilating the at least one spring brake cylinder. The service brake ventilation function is implemented in particular via a valve in the service brake system, preferably an outlet valve and/or a further outlet valve.

DE 10 2020 132 875 A1 has disclosed a method for the emergency engagement of a parking brake of a vehicle, wherein, under defined conditions, a service brake control unit lowers the reservoir pressure in at least one brake circuit for the service brake in program-controlled fashion. Provision is made whereby the service brake control unit deactivates a delivery of compressed air into the service brake, in order to to avoid the possibility of an increase in pressure in the brake circuit for the service brake.

EP 3 145 769 A1 describes that, in electropneumatic brake control devices for controlling a parking brake of a vehicle, a failure of the electrical energy supply constitutes a problem because electromagnetic valve devices can then no longer be actuated, and the electrical parking brake signal transmitter also fails. An automatic ventilation of the spring brake cylinders of the spring brake in the event of a failure of an electrical energy supply during travel (emergency braking operation) is foreseeably problematic owing to the risk of an accident. With reference to EP 1 968 830 B1, it is found that, if an electrical energy supply is intact, a lowering of the reservoir pressure in the compressed-air reservoirs owing to an actuation of the service brake is opposed by a replenishing delivery action of a compressor, and this can prevent the undershooting of a pressure threshold of the reservoir pressure, such as is necessary in order to engage the parking brake. This problem is however not considered to be severe, because a failure of the electrical energy supply supposedly generally causes a failure of the drive machine of the vehicle and thus a stoppage of replenishing delivery by the compressor. The compressed air reservoirs of the service brake are evacuated by repeated actuation of the service brake, whereby the spring brake is engaged. Since the service brake has previously been repeatedly actuated, it is assumed that the vehicle has then already been slowed down or is already at a standstill.

In fact, in some vehicles or vehicle configurations, deactivation of the compressor is not ensured in all fault situations. The compressor then continues to deliver compressed air (replenishing delivery) despite the fact that, as a result of a fault having occurred, a decrease of the reservoir pressure is desired in order that the parking brake is engaged in order to brake or safely park the vehicle.

In the prior art, in driver-controlled vehicles, so-called “pumping-down” is applied, where the driver actuates the service brake multiple times. This greatly increases air consumption, with the aim of lowering the pressure level to such an extent that the spring brake cylinders of the vehicle consequently engage.

Further partially redundant systems are known from DE 10 2022 101 142 A1, DE 10 2021 122 498 A1 and DE 10 2021 122 499 A1.

Even though redundant options for engaging a parking brake have already been created by known systems, there is a demand for further improvements. One problem lies in replenishing delivery by the running compressor. Replenishing delivery by the running compressor can prevent or at least delay the engagement of the parking brake, because the reservoir pressure is maintained or increased. If the compressor is operating with delivery action, the reservoir pressure is not lowered, or is not lowered quickly enough, for example by way of the so-called pumping down, that is, the repeated actuation of the service brake, and therefore the parking brake does not reliably engage. The achievable consumption of compressed air by the service brake is therefore not sufficient to quickly and reliably engage the parking brake. Another problem exists in vehicles with relatively high levels of automation (SAE level 4 or 5), where a driver who could manually take action to engage the parking brake, or lower the reservoir pressure in the manner required for this purpose, is not always present.

SUMMARY

It is an object of the disclosure to specify an improved electronically controllable pneumatic brake system, in which the engagement of the parking brake is made possible reliably and preferably quickly, in particular even when a compressor of the compressed-air supply is running. In particular, it is sought that the parking brake can be reliably engaged even in the event of a fault of the brake system, that is, in a redundancy situation, preferably even in vehicles with relatively high levels of automation (for example SAE level 4 or 5).

The aforementioned object is, for example, achieved in particular via a compressed-air supply arrangement for supplying compressed air to an electronically controllable pneumatic brake system of a utility vehicle, including: a compressor for generating compressed air; an air treatment unit for treating compressed air delivered by the compressor; at least one compressed-air reservoir for providing a reservoir pressure for pressurizing at least one spring brake cylinder of a parking brake of the brake system with compressed air, wherein the compressed-air reservoir is connected via at least one compressed-air delivery line to a compressed-air outlet of the compressor; and at least one delivery-rate limiting device, which includes a switchable valve unit, for limiting the compressed-air flow delivered by the compressor through the at least one compressed-air delivery line to the at least one compressed-air reservoir, wherein the switchable valve unit is configured to be switched, in the event of a fault of the brake system, via a switching signal received from an electronic brake control unit of the brake system.

The disclosure thus proposes limiting the compressed-air flow that is delivered (by replenishing delivery) by the compressor to the at least one compressed-air reservoir, whereby (at least in the case of adequately high compressed-air consumption) the reservoir pressure that is available for pressurizing a spring brake cylinder is also limited. In various embodiments, the limitation of the compressed-air flow that is delivered to the compressed-air reservoir is achieved by the delivery-rate limiting device whilst the compressor is running, that is, preferably not by deactivation (that is, shutting down) of the compressor, in particular not by deactivation of the drive of the compressor. The valve unit is thus switched, in order to limit the compressed-air flow, preferably whilst the compressor is running. In particular, when the compressor is in the running state, the drive of the compressor is running, with the compressor preferably being connected (coupled) to the drive (via a clutch). The drive of the compressor is typically a drive of the vehicle, for example a vehicle engine.

In particular, the spring brake cylinders are constructed such that, when a particular pressure level is undershot, they overcome the pneumatic pressure force, and engage, under the action of a spring force. The parking brake can thus be released when pressurized with compressed air. The parking brake is preferably electronically controllable.

The compressed-air delivery line may include a plurality of (sub-)portions, in particular a first compressed-air delivery line (sub-)portion between the compressor and an air treatment unit, and a second compressed-air delivery line (sub-)portion between the air treatment unit and the at least one compressed-air reservoir (compressed-air reservoir accumulator, preferably compressed-air tank). The compressed-air delivery line may include branching points (and merging points), in particular a bypass line.

The at least one compressed-air reservoir is in particular configured (in each case) as a compressed-air reservoir accumulator (compressed-air tank), and supplies compressed air to at least one brake circuit of the brake system, in particular to at least one service brake circuit and one parking brake circuit. Furthermore, an auxiliary compressed-air circuit of the utility vehicle may be provided, for example for the purposes of providing compressed air for the air suspension system of the utility vehicle or of the driver's cab and for the transmission control system.

The delivery-rate limiting device is in particular arranged upstream of the at least one compressed-air reservoir, preferably upstream of a branching point at which the compressed-air delivery line splits (branches) into the compressed-air supply of a service brake (of a service brake circuit) and the compressed-air supply of the parking brake (of a parking brake circuit).

A supply is provided to the parking brake, in particular a parking brake valve unit of the parking brake, preferably at least from a first compressed-air reservoir or a second compressed-air reservoir, or from a third compressed-air reservoir, but preferably from both the first and the second compressed-air reservoir. For this purpose, the parking brake may have a push-pull valve which pressure-transmittingly connects both the first and the second compressed-air reservoir to the spring brake cylinders. It is alternatively also conceivable for the parking brake unit to be supplied with reservoir pressure directly from the air treatment unit. In particular in the case of electronically controllable pneumatic brake systems such as are used in North America, Canada or also in some other regions of the world, it is common for a supply to be provided to spring brake cylinders of a parking brake from two compressed-air reservoirs, in particular the first and second compressed-air reservoir that are provided for a front-axle brake circuit and a rear-axle brake circuit.

The air treatment unit may firstly perform functions for compressed-air treatment, such as compressed-air purification, in particular oil separation, or compressed-air drying. The compressed-air treatment unit may secondly perform the (pneumatic) control of the compressor, preferably via a compressor control line. The air treatment unit may furthermore have, or be connected to, a multi-circuit protection valve such as is known per se, which is configured to distribute the compressed air flowing into the air treatment unit among multiple compressed-air reservoirs (compressed-air reservoir accumulators), which are in particular assigned to different brake circuits of the brake system.

Limiting the compressed-air flow that is delivered by the compressor through the at least one compressed-air delivery line may include not only reducing the flow rate (lower flow rate, not equal to zero), in particular by (local) reduction of the flow cross section, but also (completely) shutting off, and/or ventilating, the compressed-air delivery line (flow rate equal to zero). The compressed-air delivery line may be capable of being shut off (closed), and/or connected to an (atmospheric) pressure sink, through the control of the switchable valve unit. The shutting-off of the compressed-air delivery line may be understood as a reduction of the flow cross section to zero. The compressed-air flow that is delivered through the compressed-air delivery line can be limited by ventilation, for example by virtue of the compressed-air delivery line being connected, at a point between the compressed-air outlet of the compressor and a compressed-air reservoir, to a pressure sink (atmospheric surroundings), because, although the compressor feeds compressed air into the compressed-air delivery line, the ventilation means that the compressed air escapes to the pressure sink and is not delivered to the compressed-air reservoir. Ventilation (directly into the surroundings) is understood to be performed even if, for example, a line and/or a silencer and/or a reed valve are provided. In this respect, blocking or ventilation of the compressed-air delivery line (of a line portion of the compressed-air delivery line) can be understood to mean a limitation of the flow rate through the compressed-air delivery line (as a whole, as far as the compressed-air reservoir) to zero.

The switchable valve unit of the delivery-rate limiting device preferably includes at least one (electrically) switchable (controllable) valve (solenoid valve) and may be configured as an (electrically) switchable (controllable) valve (solenoid valve). The switchable valve unit preferably includes at least one 2/2 directional valve (2/2 directional solenoid valve) or one 3/2 directional valve (3/2 directional solenoid valve). In an embodiment, the switchable valve unit is a switchable shut-off valve (2/2 directional shut-off valve). A switchable valve unit configured as an electromagnetic valve (solenoid valve) is preferably deenergized in a first switching position (for the purposes of delivering compressed air) and energized in a second switching position (for the purposes of limiting the flow rate).

The switchable valve unit receives the switching signal in particular from a (secondary) electronic brake control unit of the brake system. The valve unit is switched in accordance with the received switching signal in order to limit the compressed-air flow delivered (by replenishing delivery) into the compressed-air reservoir. A limited feed of compressed air promotes the lowering of the reservoir pressure (reservoir pressure level) by way of the consumption of air by the brake system, preferably the secondary brake system. In particular, a situation in which the reservoir pressure is maintained or increased (again) by way of a replenishing delivery of compressed air by the compressor is prevented, such that the spring brake cylinders can reliably engage. In particular, by way of the switched delivery-rate limiting device and the (simultaneous) consumption of air by the brake system, the reservoir pressure level is lowered to such an extent that the at least one spring brake cylinder engages and thus brakes the vehicle. The consumption of air can be effected by actuation of the service brake. Provision may be made whereby the service brake control unit causes the lowering of the reservoir pressure in at least one of the brake circuits for the service brake by way of an actuation of the service brake. That is, the reservoir pressure in the brake circuit is lowered by, in particular repeated, actuation of the service brake (so-called pumping-down), that is, preferably by repeated pressurization and ventilation of brake cylinders of the service brake. The compressed-air supply arrangement in particular ensures that the compressed-air consumption flow through at least one service brake (service brake circuit) exceeds the compressed-air flow delivered by the compressor by an appropriate value, in order to achieve a (rapid) reduction of the reservoir pressure.

Switching of the valve unit of the delivery-rate limiting device is performed in particular in the event of a fault of the brake system in which a primary electronic brake control unit is not functioning or is not functioning correctly and a secondary electronic brake control unit is also not functioning or not functioning correctly, or some other relevant system is not functioning correctly or is no longer functioning correctly, such that the corresponding switching signal is consequently output for the switchable valve unit of the delivery-rate limiting device in order to reliably brake the vehicle. In general, a fault of the brake system can be understood to mean unintended functioning, such as a software malfunction, a hardware fault (for example as a result of failure or damage) or an electrical failure of a brake control unit.

Various embodiments of the disclosure have the advantage that the engagement of the parking brake is made reliably possible, in particular even when a compressor of the compressed-air supply is running, owing to the limitation of the compressed-air delivery rate by the switchable delivery-rate limiting device—with (simultaneous) sufficiently high consumption of compressed air by the brake system, in particular by actuation of the service brake of the brake system. The parking brake can be reliably engaged even in the event of a fault of the brake system, in particular even in vehicles with relatively high levels of automation.

In an embodiment of the compressed-air supply arrangement, the switchable valve unit, in a switching position for limiting the delivery rate, at least partially prevents a replenishing delivery of compressed air into the at least one compressed-air reservoir by the compressor. In particular, a first switching position of the valve unit serves for the delivery of compressed air, and a second switching position serves for limiting the delivery rate.

In an embodiment of the compressed-air supply arrangement, the reservoir pressure provided by the compressed-air reservoir when the switchable valve unit is in a second switching position is reduced in relation to the reservoir pressure provided by virtue of compressed air being delivered via the compressor into the compressed-air reservoir when the switchable valve unit is in a first switching position. This reduced reservoir pressure can preferably be ensured, when the switchable valve unit is in the second switching position, by way of (simultaneous) consumption of compressed air from the at least one compressed-air reservoir, in particular by ventilation of a service brake actuator (service brake cylinder) before and/or whilst the switchable valve unit is switched into the second switching position. The delivered compressed-air flow (delivery rate) (in the second switching position) is preferably equal to or lower than the consumed compressed-air flow (consumption rate). Preferably, a second reservoir pressure value that is provided in the compressed-air reservoir (compressed-air reservoir accumulator) when the switchable valve unit is in the (second) switching position (for limiting the delivery rate) is reduced in relation to a first reservoir pressure value that is provided in the compressed-air reservoir when the switchable valve unit is in a (first) switching position (for the delivery of compressed air via the compressor).

In an embodiment of the compressed-air supply arrangement, the air treatment unit is arranged upstream of the at least one compressed-air reservoir, and the at least one switchable valve unit of the delivery-rate limiting device is arranged upstream of a compressed-air inlet of the air treatment unit or is integrated into the air treatment unit. An integration of the delivery-rate limiting unit into the air treatment unit can be understood to mean an arrangement within a common housing.

In an embodiment of the compressed-air supply arrangement, the air treatment unit is arranged upstream of the at least one compressed-air reservoir, wherein the compressed-air supply arrangement includes a first compressed-air reservoir of a first service brake circuit of the brake system, for the purposes of supplying compressed air to at least one first service brake actuator at a first axle of the utility vehicle, and includes a second compressed-air reservoir of a second service brake circuit of the brake circuit, for the purposes of supplying compressed air to at least one second service brake actuator at a second axle of the utility vehicle, wherein the air treatment unit is arranged upstream of the first compressed-air reservoir and of the second compressed-air reservoir, wherein the switchable valve unit of a first delivery-rate limiting device is arranged downstream of a compressed-air outlet of the air treatment unit and upstream of a compressed-air inlet of the first compressed-air reservoir, and/or wherein the switchable valve unit of a second delivery-rate limiting device is arranged downstream of a compressed-air outlet of the air treatment unit and upstream of a compressed-air inlet of the second compressed-air reservoir.

It is thus possible to achieve a limitation of the delivery rate (delivered compressed-air flow) into at least one of the two compressed-air reservoirs, in particular separately from one another. By limiting the compressed-air delivery rate, the reservoir pressure in the particular compressed-air reservoir can also be limited, depending on the consumption of compressed air by the brake system, in particular by the service brake. A first compressed-air reservoir may be assigned to a first service brake circuit, and a second compressed-air reservoir may be assigned to a second service brake circuit, for the purposes of (independently) supplying compressed air. The first and/or the second compressed-air reservoir may be (fluidically) connected to a third compressed-air reservoir, optionally via at least one interposed valve, such that a limitation (reduction) of the delivery rate into the first and/or second compressed-air reservoir (and of the reservoir pressure therein) (also) leads to a limitation (reduction) of the delivery rate into the third compressed-air reservoir (and of the reservoir pressure therein). The third compressed-air reservoir is preferably assigned to a parking brake circuit in order to supply compressed air thereto.

In an embodiment of the compressed-air supply arrangement, the switchable valve unit of the delivery-rate limiting device is configured to shut off the compressed-air delivery line, and/or to connect at least one line portion of the compressed-air delivery line to a flow-rate reduction portion of the delivery-rate limiting device, on the basis of the switching signal received from an electronic brake control unit of the brake system. The switchable valve unit (the switchable valve) is in particular configured to connect a first line portion of the compressed-air delivery line to an inlet end of the flow-rate reduction portion and connect a second line portion of the compressed-air delivery line to an outlet end of the flow-rate reduction portion. A (fluidic) connection can be understood to mean that compressed air can flow from the compressor to the compressed-air reservoir, in particular through at least one (pneumatic) line. The switchable valve unit may be configured as a (exactly one) valve, for example as a 2/2 directional valve (2/2 directional solenoid valve) or as a 3/2 directional valve (3/2 directional solenoid valve), wherein the flow-rate reduction portion may be part of the valve. The flow-rate reduction portion is in particular configured to reduce the compressed-air flow that is delivered from the compressed-air outlet of the compressor to the at least one compressed-air reservoir (compressed-air reservoir accumulator), preferably by way of a reduced line cross section (nominal cross section, preferably nominal diameter) (in certain portions). The flow-rate reduction portion may be configured as a (continuous) line portion (flow-rate reduction line portion) or as a passage opening (flow-rate reduction opening) having a reduced flow cross section (line cross section) in relation to the compressed-air delivery line. A flow-rate reduction portion (cross-sectional constriction) generally leads to a pressure loss in the flow and thus to a lowering of the pressure across the flow-rate reduction portion, whereby the provided reservoir pressure is reduced.

In an embodiment of this compressed-air supply arrangement, the flow-rate reduction portion is configured as a throttling portion. A flow-rate reduction portion configured as a throttling portion (nozzle) has, in particular, a flow cross section which continuously decreases upstream of a minimum opening diameter in relation to a flow direction and which continuously increases downstream of the minimum opening diameter. A throttling portion (a throttle) leads to a pressure loss and thus to a lowering of the pressure difference across the throttling portion. The delivered compressed-air flow (the delivery rate) is thus limited, that is, is reduced to a lower compressed-air flow. The reservoir pressure generated in a compressed-air reservoir and provided for the purposes of supplying compressed air can also thereby be limited, specifically reduced to a lower maximum reservoir pressure (in relation to the delivery of compressed air without a throttling portion) depending on the volume flow balance of the delivered and consumed compressed-air flows.

In an embodiment, the throttling portion is part of the movable valve element, preferably in the form of a throttle-like passage opening.

In another embodiment, the throttling portion is an (immovable) line portion (channel portion) of the valve (valve housing), which is in particular connected to an outlet of the valve (3/2 directional valve).

In a further embodiment, the flow-rate reduction portion (throttling portion) is arranged as a line portion of a bypass line (parallel line) of the compressed-air delivery line which branches off from the compressed-air delivery line, wherein, on the basis of a control signal from an electronic brake control unit of the brake system, the switchable valve of the delivery-rate limiting device shuts off a line portion of the compressed-air delivery line and conducts the compressed-air flow, which is delivered by the compressor, through the flow-rate reduction portion (throttling portion) of the bypass line to a compressed-air inlet of the air treatment unit and/or to the at least one compressed-air reservoir.

In an embodiment of the compressed-air supply arrangement, the switchable valve unit (switchable ABS valve unit) of the delivery-rate limiting device is configured to shut off and/or ventilate the compressed-air delivery line on the basis of the switching signal received from an electronic brake control unit of the brake system. In particular, the switchable valve unit may be configured such that, in a first switching position, it connects the compressed-air outlet of the compressor to the at least one compressed-air reservoir, and in a second switching position, it shuts off the compressed-air delivery line or connects same to a ventilation outlet of the valve unit.

In an embodiment of the compressed-air supply arrangement, the switchable valve unit of the at least one delivery-rate limiting device is configured as a switchable ABS valve unit. Here, a first valve connection of the switchable ABS valve unit is connected to a compressed-air outlet of the compressor, a second valve connection of the switchable ABS valve unit is connected to a compressed-air inlet of the air treatment unit or to the at least one compressed-air reservoir, and a third valve connection of the switchable ABS valve unit is connected to a vent. The ABS valve unit is thus used for flow rate limitation.

ABS valve units (ABS valves) are generally known in the prior art. They have a relatively large nominal cross section. ABS valves can therefore advantageously be used to rapidly ventilate a particular compressed-air path with a short reaction time. In this respect, known ABS valves are particularly suitable for ventilating the compressed-air delivery line and/or the compressed-air reservoir (compressed-air reservoir accumulator). Such ventilation causes the reservoir pressure to be limited, specifically typically lowered to the atmospheric pressure. Known ABS valves are also suitable for outputting a brake pressure over a period of time determined by the received switching signals.

In an embodiment of this compressed-air supply arrangement, the switchable ABS valve unit has a pneumatically switchable inlet valve, a pneumatically switchable outlet valve, an electromagnetic inlet valve, and an electromagnetic outlet valve. Firstly, via the 2/2 directional inlet valve part of the ABS valve unit, including the pneumatically switchable inlet valve and the electromagnetic (electromagnetically switchable) inlet valve, the compressed-air flow delivered by the compressor can be shut off. Secondly, via the 2/2 directional outlet valve part of the ABS valve unit, including the pneumatically switchable outlet valve and the electromagnetic (electromagnetically switchable) outlet valve, the compressed-air reservoir (compressed-air reservoir accumulator, preferably compressed-air tank) can be ventilated selectively, in particular in accordance with the switching signal received from a (secondary) electronic brake control unit of the brake system. The vent may be switched independently of the shutting-off of the feed of compressed air. There is thus no need for actuation of the service brake, in particular by “pumping-down” (cyclic pressurization and ventilation). This has the advantage that, as the emergency engagement of the parking brake is performed, a continuous resulting holding brake pressure can continue to be modulated at the service brake via the service brake, in particular before the compressed-air reservoir is ventilated.

In an embodiment, a first delivery-rate limiting device, which is arranged upstream of a compressed-air inlet of the first compressed-air reservoir, has a first ABS valve (a first ABS valve unit), and a second delivery-rate limiting device, which is arranged upstream of a compressed-air inlet of the second compressed-air reservoir, has a second ABS valve (a second ABS valve unit). In particular, a controllable solenoid valve of the first ABS valve and a controllable solenoid valve of the second ABS valve are controllable by a (secondary) electronic brake control unit of the brake system.

In an embodiment of the compressed-air supply arrangement, the air treatment unit is connected, for the purposes of providing a compressor control pressure, via a compressor control line to a control unit of the compressor, and the switchable valve unit of the delivery-rate limiting device is arranged in the compressor control line. The switchable valve unit may include multiple (for example two) switchable valves connected in series. In particular, the compressor control line is connected to a control unit of the compressor, which control unit controls the operation of the compressor, in particular the rotational speed thereof and/or the connection thereof to a drive (of the vehicle) via a clutch. The compressor control pressure may correspond to the reservoir pressure in at least one of the pressure reservoirs. Via the compressor control line, the operating state of the compressor can be controlled, preferably via a (pneumatic) control unit of the air treatment unit, such that the compressor is switched from a delivery operating state (load operation or full-load operation) into an operating state with reduced delivery capacity (part-load operation or idle operation) or, preferably by virtue of the drive clutch being opened, into a non-delivery operating state (standstill). In the non-delivery operating state, the compressor is preferably separated (decoupled) from the drive such that it does not (it no longer) run(s) (rotate(s)). The replenishing delivery of compressed air by the compressor into the compressed-air reservoir is thus prevented.

In an embodiment of this compressed-air supply arrangement, the switchable valve unit is configured such that, in a first switching position, it connects a control pressure inlet of the compressor to a control pressure outlet of the air treatment unit, and in a second switching position, it ventilates the compressor control line. In this embodiment, the compressor delivers compressed air when the compressor control line is pressurized (that is, when the compressor control line is charged with a compressor control pressure not equal to zero), and does not deliver compressed air when the compressor control line is ventilated.

In an alternative embodiment of this compressed-air supply arrangement, the switchable valve unit is configured such that, in a first switching position, it connects a control pressure inlet of the compressor to a control pressure outlet of the air treatment unit, and in a second switching position, it connects the control pressure inlet of the compressor to an auxiliary reservoir pressure of the brake system. In this embodiment, the compressor delivers compressed air when the compressor control line is unpressurized, and does not deliver compressed air when the compressor control line is pressurized. In particular, in the second switching position, the control pressure inlet of the compressor is connected via a redundant compressor control line portion to an auxiliary reservoir pressure of the brake system. In an embodiment, the auxiliary reservoir pressure is provided by a compressed-air reservoir of an auxiliary compressed-air circuit of the brake system, which in this respect can be referred to as an auxiliary reservoir pressure source. A pressure retaining device for retaining the auxiliary reservoir pressure as a compressor control pressure may optionally be provided in the compressor control line portion. The pressure retaining device may be configured as a check valve or (actively) switchable holding valve (solenoid valve). Aside from a (first and second) compressed-air reservoir for providing a supply to the service brake circuits and optionally a (third) compressed-air reservoir for providing a supply to the parking brake circuit, a separate (fourth) compressed-air reservoir may be provided for providing a supply to the auxiliary compressed-air circuit. The switchable valve unit is preferably configured as a solenoid valve which is deenergized in the first switching position and energized in the second switching position.

In an embodiment of the compressed-air supply arrangement, the delivery-rate limiting device includes a pressure sensor for detecting a compressor control pressure in the compressor control line. The pressure sensor is configured to transmit a compressor control pressure signal, which represents the detected compressor control pressure, to an electronic brake control unit of the brake system. The pressure sensor is arranged in particular in the compressor control line, preferably in that compressor control line portion which is connected to the control pressure inlet of the compressor. The (secondary) electronic brake control unit is in particular configured to output a switching signal to the switchable valve unit in the compressor control line on the basis of the received compressor control pressure signal, in particular if a compressor control pressure detected by the pressure sensor falls below a specified pressure level (specified pressure value). A lowering of the compressor control pressure indicates, in particular, a lowering of the reservoir pressure, which is caused in particular by (desired, in particular intentionally effected) consumption of air by the service brake. In this way, the replenishing delivery of compressed air by the compressor into the compressed-air reservoir can be prevented as soon as the reservoir pressure has begun to decrease. The reservoir pressure is thus prevented from increasing (again).

The aforementioned object is furthermore achieved in particular via an electronically controllable pneumatic brake system for a utility vehicle, including:

- a compressed-air supply arrangement according to the disclosure, in particular according to any one of the embodiments described above,
- a parking brake having at least one spring brake cylinder that can be pressurized with compressed air, via a reservoir pressure provided from the at least one compressed-air reservoir, in order to release the parking brake, and
- at least one electronic brake control unit, which is configured to output a switching signal to the switchable valve unit of the at least one delivery-rate limiting unit in the event of a fault of the brake system.

The electronically controllable pneumatic brake system described herein may have not only the at least one first service brake circuit but also at least one second service brake circuit. For example, the first service brake is a rear-axle brake circuit, whereas a second service brake circuit is a front-axle brake circuit. Further brake circuits such as a trailer brake circuit, or further brake circuits for further axles, may also be provided. It is also conceivable for brake circuits not to be distributed on an axle-specific basis, but to encompass other subassemblies of the brake system, for example the left-hand and right-hand sides of the vehicle. In this respect, in addition to the first primary service brake pressure modulator, it is typically the case that a second primary service brake pressure modulator is provided in the electronically controllable pneumatic brake system and controls one, or the second, axle. Preferably, the primary electronic brake control unit is connected to the second primary service brake pressure modulator and provides second primary switching signals thereto for the purposes of switching at least one electromagnetic valve of the second primary service brake pressure modulator.

Additionally, a primary level and at least one secondary level are provided, wherein one or more valves or one or more modulators may be structurally assigned to both the primary and the secondary level. The primary level is controlled by the primary electronic brake control unit, whereas the secondary level is controlled by the secondary electronic brake control unit. The electronically controllable pneumatic brake system is preferably operated in the secondary level if, in the primary level, one or more faults occur which partially or entirely prevent a service brake pressure from being modulated normally in the primary level.

The parking brake has, in particular, a parking brake valve unit for providing a parking brake pressure with which the at least one spring brake cylinder is pressurized (in order to release the parking brake).

Furthermore, a first voltage source is preferably provided for the purposes of supplying electrical power to the primary electronic brake control unit. A second voltage source is preferably also provided for the purposes of providing a supply to the secondary electronic brake control unit. The first and second voltage source are preferably independent of one another, such that a failure of the first voltage source does not lead to a failure of the second voltage source, and vice versa.

In an embodiment of the electronically controllable pneumatic brake system, the electronic brake control unit is a secondary electronic brake control unit that is configured to receive maneuver-related braking data via a vehicle bus from a vehicle control unit for autonomous driving or from a redundant vehicle control unit for autonomous driving. The secondary electronic brake control unit is configured to at least partially control at least one service brake circuit of the brake system in the event of a fault of a primary electronic brake control unit of the brake system.

In an embodiment of the electronically controllable pneumatic brake system, the electronically controllable parking brake includes a parking brake valve unit, to which reservoir pressure is supplied, for providing a parking brake pressure with which the at least one spring brake cylinder can be pressurized, wherein the reservoir pressure is provided:

- by a first compressed-air reservoir of a first service brake circuit of the electronically controllable pneumatic brake system, for the purposes of supplying compressed air to at least one first service brake actuator at a first axle of the utility vehicle,
- by a second compressed-air reservoir of a second service brake circuit of the electronically controllable pneumatic brake system, for the purposes of supplying compressed air to at least one second service brake actuator at a second axle of the utility vehicle,
- by a third compressed-air reservoir of a parking brake circuit, for the purposes of supplying compressed air to the parking brake valve unit, and/or
- directly by an air treatment unit for treating the compressed air delivered by a compressor.

The aforementioned object is furthermore achieved via a method for engaging a parking brake of an electronically controllable pneumatic brake system of a utility vehicle, in particular according to any one of the embodiments described above, including the following steps:

- detecting a fault in the electronically controllable pneumatic brake system, preferably via an electronic brake control unit of the electronically controllable pneumatic brake system, wherein the detected fault prevents the electronically controllable parking brake from being engaged via a switching operation of a parking brake valve unit of the parking brake such that at least one spring brake cylinder of the parking brake is ventilated;
- outputting a switching signal via an electronic brake control unit of the electronically controllable pneumatic brake system to a switchable valve unit of at least one delivery-rate limiting device of a compressed-air supply arrangement for providing a supply to the electronically controllable pneumatic brake system, in particular according to any one of the embodiments described above, wherein the switching signal has the effect that the compressed-air flow delivered by the compressor to at least one compressed-air reservoir of the electronically controllable pneumatic brake system is limited; and
- lowering a reservoir pressure for the pressurization of at least one spring brake cylinder of an electronically controllable parking brake of the electronically controllable pneumatic brake system by consuming compressed air in at least one service brake circuit or parking brake circuit of the electronically controllable pneumatic brake system.

The method according to the disclosure has embodiments and advantages identical or similar to those of the above-described pressure supply device according to the disclosure and the electronically controllable pneumatic brake system according to the disclosure. In particular, the engagement of the parking brake is made reliably possible, in particular even when a compressor of the compressed-air supply is running, owing to the limitation of the delivery rate by the switchable delivery-rate limiting device (and the thus achievable limitation of the reservoir pressure—in the case of simultaneous consumption of compressed air by the brake system). The parking brake is reliably engaged even in the event of a fault of the brake system, in particular even in vehicles with relatively high levels of automation. The method can implement and carry out all or some of the above-described functional or method-related features of the embodiments of the compressed-air supply arrangement and of the electronically controllable pneumatic brake system, and of the (optional) variants thereof, as embodiments of the method, in particular as corresponding method steps. In particular, the method may have sub-aspects identical or similar to those of the compressed-air supply arrangement and the electronically controllable pneumatic brake system.

The detected fault in the electronically controllable pneumatic brake system can be understood to mean a fault which relates to (that is, affects) the electronically controllable pneumatic brake system, such as a software malfunction, a hardware fault (for example as a result of failure or damage) or an electrical failure of the primary or secondary voltage source. The fault is preferably detected by a (primary or secondary) electronic brake control unit of the electronically controllable pneumatic brake system or by a (superordinate) vehicle control unit for autonomous driving. The electronic brake control unit of the electronically controllable pneumatic brake system for outputting a switching signal to a switchable valve unit is preferably a secondary electronic operation control unit of the brake system or a (secondary) electronic control unit of the parking brake.

The detection of a fault in the electronically controllable pneumatic brake system which prevents the electronically controllable parking brake from being engaged via a switching operation of a parking brake valve unit of the parking brake also encompasses, in particular, non-switchability of the switchable valve unit of a delivery-rate limiting device owing to a failure of the electrical power supply of the electronic brake control unit, for example as a result of a short circuit, with the result that no switching signal is output.

In an embodiment of the method, the reservoir pressure is lowered by at least partially ventilating at least one service brake actuator of at least one service brake circuit of the electronically controllable pneumatic brake system one or more times. This method step may be carried out before and/or during the method steps of the method according to the disclosure. The reservoir pressure may be lowered by virtue of at least one service brake actuator (service brake cylinder) of a service brake being actuated (ventilated) (so-called "pumping down") manually or automatically, in particular in a manner triggered via electrical and/or electronic control commands (ventilation signals). In particular, an electrical ventilation signal may be output by a secondary electronic brake control unit to a service brake actuator.

The aforementioned object is also achieved in particular via a utility vehicle including a compressed-air supply arrangement according to the disclosure for providing a supply to an electronically controllable pneumatic brake system, in particular according to any one of the embodiments described above, and/or including an electronically controllable pneumatic brake system according to the disclosure, in particular according to any one of the embodiments described above. In particular, an electronic brake control unit of the brake system is configured to carry out the method according to the disclosure, in particular according to any one of the embodiments described above. In particular, the utility vehicle has at least one front axle and at least one rear axle.

BRIEF DESCRIPTION OF DRAWINGS

The invention will now be described with reference to the drawings wherein.

DETAILED DESCRIPTION

Below, the same reference signs are used to denote structurally identical or similar elements or elements having an identical or similar function.

Figure 1:
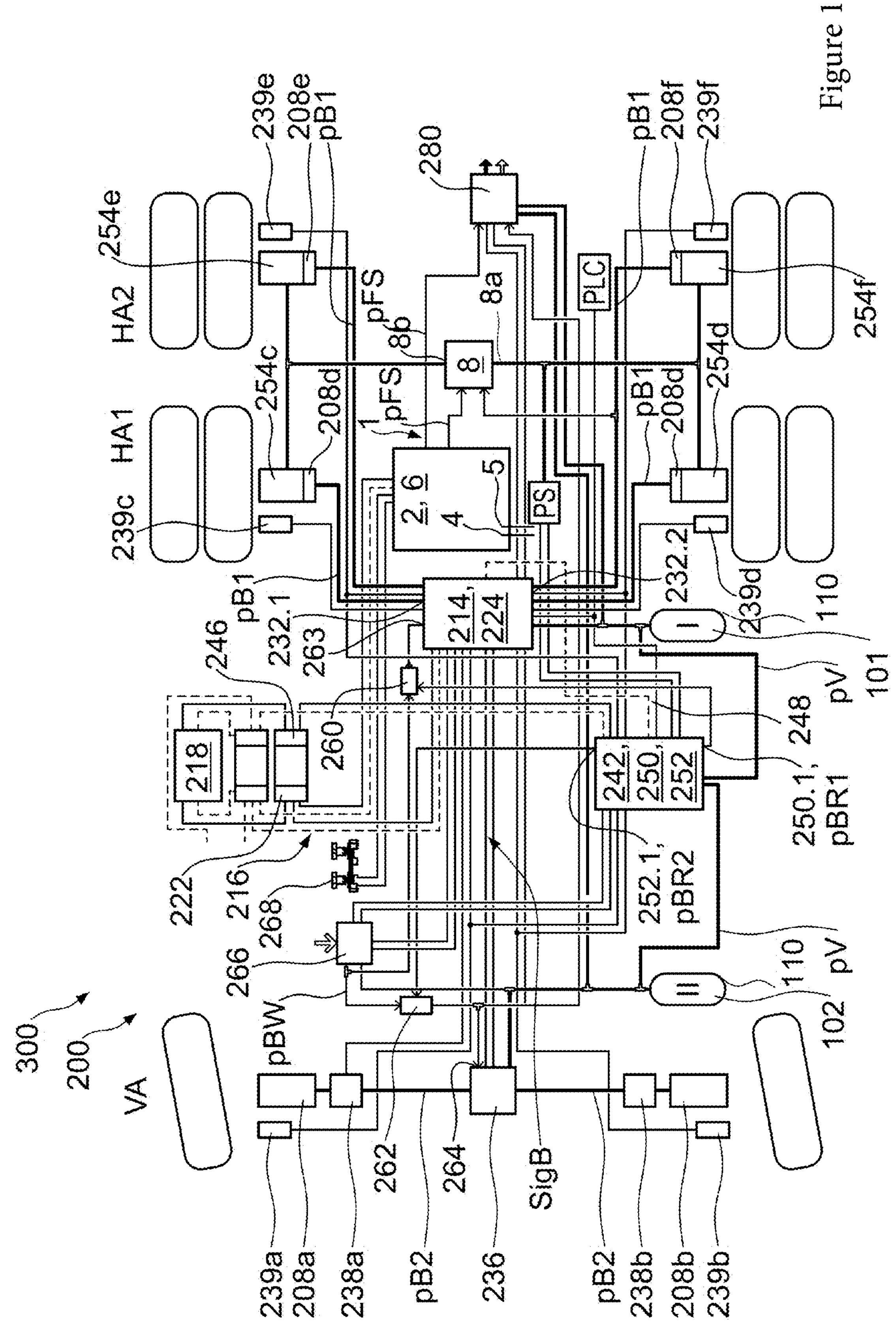
FIG. 1 is a schematic illustration of a detailed layout of an embodiment of an electronically controllable pneumatic brake system according to the disclosure installed in a utility vehicle.

The electronically controllable pneumatic brake system 200 illustrated in FIG. 1 is installed in a utility vehicle 300 (see the illustration of the front axle VA and of the rear axles HA1, HA2 and the schematic illustration of the wheels as rounded rectangles in the plan view). The electronically controllable pneumatic brake system 200 is equally applicable to vehicles which have only one rear axle or even two front axles or three or more rear axles.

The electronically controllable pneumatic brake system 200 has a service brake and at least one first redundancy level (the levels are not illustrated). In the operational level, the electronically controllable pneumatic brake system 200 includes a primary system having a primary electronic control unit 214 that controls the electronically controllable pneumatic brake system 200 in the operational level. The primary electronic control unit 214 is connected via an electronic connection, in this case a vehicle bus 216, to a vehicle control unit for autonomous driving 218, and from this receives maneuver-related braking data, such as braking demand signals. Furthermore, the primary electronic brake control unit 214 is connected to a first voltage source 222 and is supplied with electrical voltage therefrom. The primary electronic brake control unit 214 converts the braking demand signals and, on the basis thereof, outputs first primary switching signals, for example in the form of service brake signals SigB, to a first primary service brake pressure modulator 224. The first primary service brake pressure modulator 224 is provided in this case for a rear axle HA, and can thus also be referred to as primary rear-axle service brake pressure modulator or primary rear-axle modulator.

The first primary service brake pressure modulator 224 is connected to a first compressed-air reservoir 101 and receives reservoir pressure pV1 or pV (see further below) therefrom. On the basis of the received service brake signals SigB, the first primary service brake pressure modulator 224 outputs a first service brake pressure pB1 at least at one first service brake pressure connection 232.1 and preferably one second service brake pressure connection 232.2. The first service brake pressure pB1 is preferably modulated on a wheel-specific basis at the first and second service brake pressure connections 232.1, 232.2, and the first primary service brake pressure modulator 224 is configured as a two-channel modulator. In other embodiments, the first service brake pressure connection 232.1 and the second service brake pressure connection 232.2 may however also be combined, and the first primary service brake pressure modulator 224 may thus be configured as a single-channel axle modulator, which modulates the first service brake pressure pB1 on an axle-specific basis.

In order to brake at least one further axle, the electronically controllable pneumatic brake system 200 includes, in the operational level, a second primary service brake pressure modulator 236, which is for example provided for a front axle VA and which can thus also be referred to as front-axle modulator. The second primary service brake pressure modulator 236 receives reservoir pressure pV2 or pV (see further below) from a second compressed-air reservoir 102 and modulates a second service brake pressure pB2 on an axle-specific basis, a side-specific basis or a wheel-specific basis at least at one third service brake pressure connection 236.1 and preferably one fourth service brake pressure connection 236.2. The second primary service brake pressure modulator 236 may also be configured as a single-channel or two-channel axle modulator, and is preferably configured as a two-channel axle modulator.

In the redundancy level, the electronically controllable pneumatic brake system 200 includes a secondary electronic brake control unit 242 of a secondary or redundancy system, which is provided for controlling the electronically controllable pneumatic brake system 200 in the event that the operational level has one or more faults. The secondary electronic brake control unit 242 can thus control the electronically controllable pneumatic brake system 200 for example in the event of an electrical failure in the first voltage source 222, an electronic fault in the primary electronic brake control unit 214, or the like.

The secondary electronic brake control unit 242 is likewise connected via the vehicle bus 216 to the vehicle control unit for autonomous driving 218, and from this likewise receives maneuver-related braking data, such as braking demand signals or redundant braking demand signals. By contrast to the primary electronic brake control unit 214, the secondary electronic brake control unit 242 is connected to a second voltage source 246 and is supplied with electrical voltage therefrom. The first and the second voltage source 222, 246 are independent of one another, such that a failure in the first voltage source 222 does not lead to a loss of the second voltage source 246, and vice versa. The primary electronic brake control unit 214 and the secondary electronic brake control unit 242 are thus electrically independent of one another.

To be able to exchange signals, the primary electronic brake control unit 214 and the secondary electronic brake control unit 242 are connected to one another via a redundancy bus 248. In this way, the secondary electronic brake control unit 242 can determine the availability of the primary electronic brake control unit 214, and perform the control of the electronically controllable pneumatic brake system 200 only if the primary electronic brake control unit 214 is not available or not properly available. In variants, however, communication between the primary electronic brake control unit 214 and the secondary electronic brake control unit 242 may for example also take place via the vehicle bus 216.

In the redundancy level, a first secondary service brake modulator 250 is provided which is connected to the secondary electronic brake control unit 242 and which receives secondary switching signals therefrom, for example in the form of redundancy brake signals. Here, the secondary electronic brake control unit 242 is integrated into the first secondary service brake pressure modulator 250. In other variants, the secondary electronic brake control unit 242 and the first secondary service brake pressure modulator 250 may however also be physically separate units. The first secondary service brake pressure modulator 250 is connected to the first compressed-air reservoir 101, which is independent of the second compressed-air reservoir 102, such that the first compressed-air reservoir 101 can provide reservoir pressure pV even if the second compressed-air reservoir 102 has failed. In other embodiments, the first secondary service brake pressure modulator 250 may however also be connected to the first compressed-air reservoir 101 or to both the first compressed-air reservoir 101 and the second compressed-air reservoir 102, or even provided with a supply from a third compressed-air reservoir 103 (see for example FIG. 3).

The first secondary service brake pressure modulator 250 outputs a first redundancy brake pressure pBR1 at a first secondary working connection 250.1 in accordance with a redundancy brake signal. Via the first redundancy brake pressure pBR1, the first axle, preferably the rear axle, can be braked redundantly, and thus in the secondary level. This may be implemented on an axle-specific basis or on a wheel-specific basis.

In the embodiment shown here, a second secondary service brake pressure modulator 252 is also provided, which is provided in particular for replacing the second primary service brake pressure modulator 236. The second secondary service brake pressure modulator 252, like the first secondary service brake pressure modulator 250, receives redundancy brake signals and modulates a second redundancy brake pressure pBR2 at a second secondary working connection 252.1 in accordance with the signals.

The brake actuators assigned to the wheels of the rear axles HA1, HA2 are configured here as double-acting brake actuators, also referred to as Tristop cylinders. Aside from the service brake actuators 208*c*-208*f*, the brake actuators each also include a spring brake cylinder 254*c*-254*f*. The spring brake cylinders 254*c*-254*f* are configured to apply the brakes of the utility vehicle 300 when unpressurized or ventilated. The spring brake cylinders 254*c*-254*f* can thus advantageously be utilized as parking brakes, because no compressed air needs to be provided in order to brake the rear axles HA1, HA2. To release the rear wheels, the spring brake cylinders 254*c*-254*f* must be pressurized with a parking brake pressure pFS. This parking brake pressure pFS acts counter to the spring accumulators and releases the brakes of the vehicle 300.

To provide the parking brake function, the brake system 200 includes a parking brake 1. The parking brake includes an electropneumatic parking brake valve unit 2 to which reservoir pressure pV1 from the first compressed-air reservoir 101 is supplied via a first reservoir connection 4, reservoir pressure pV2 from the second compressed-air reservoir 102 is supplied via a second reservoir connection 5, and, optionally (not illustrated), reservoir pressure pV3 from the third compressed-air reservoir 103 is supplied via a third reservoir connection (see for example FIG. 3). Depending on the configuration of the compressed-air reservoirs 101, 102, 103 and the pneumatic connection thereafter one another, the reservoir pressures pV1, pV2 and pV3 may fluidically equalize with one another and thus be jointly referred to as reservoir pressure pV. It would however also be possible for reservoir pressure pV (or specifically pV1, pV2 or pV3) to be supplied to the parking brake valve unit 2 only from one of the two compressed-air reservoirs 101, 102 or from a third compressed-air reservoir 103 or directly from an air treatment unit 105.

The electropneumatic parking brake valve unit 2 includes a parking brake control unit 6 that is connected via the vehicle bus 216 to the vehicle control unit for autonomous driving 218. To engage the parking brake 1, the vehicle control unit for autonomous driving 218 provides a parking brake signal to the parking brake control unit 6 via the vehicle bus 216, and the parking brake control unit thereupon provides the parking brake pressure pFS at a first spring accumulator connection 8*a* and at a second spring accumulator connection 8*b*. In FIG. 1, the first spring accumulator connection 8*a* is connected to the spring brake cylinders 254*d*, 254*f*, and the spring accumulator connection 8*b* is connected to the spring brake cylinders 254*c*, 254*e*. By providing the parking brake pressure pFS, the electropneumatic parking brake valve unit 2 pressurizes the spring brake cylinders 254*c*-254*f* and thus releases the parking brake. To engage the parking brake of the utility vehicle 300, the electropneumatic parking brake valve unit 2 can ventilate the spring accumulator connections 8*a*, 8*b* and the spring brake cylinders 254*c*-254*f* connected thereto. This may be performed in response to corresponding parking brake signals being received at the parking brake control unit 6, or when parking brake signals are no longer being provided by the parking brake control unit 6.

The disclosure relates in particular to the situation in which a fault occurs in the brake system 200, which fault prevents the parking brake 1 from being engaged or makes it necessary for the parking brake 1 to be redundantly engaged, for example in order to safely stop or hold the vehicle 300 instead of a non-functioning or incorrectly functioning service brake 9. In particular, the service brake 9 includes the service brake actuators 208*c*-208*f*.

The first compressed-air reservoir 101 is provided in this case for a first brake circuit BK1, which corresponds to a rear-axle brake circuit. The second compressed-air reservoir 102 is provided in this case for a second brake circuit BK2, which corresponds to a front-axle brake circuit. Here, the electronically controllable pneumatic brake system 200 has a total of six service brake actuators, specifically first and second service brake actuators 208*a*, 208*b* at the front axle VA, and third, fourth, fifth and sixth service brake actuators 208*c*-208*f* at the first and second rear axles HA1, HA2. The service brake actuators 208*c*-208*f* at the rear axles HA1, HA2 are combined with the spring brake cylinders 254*c*-254*f* to form so-called Tristop cylinders.

The primary electronic brake control unit 214 is combined with the first primary service brake pressure modulator 224 to form a module and is illustrated as a structural unit. The module may also be referred to as a (primary) central module and has the function of both the primary electronic brake control unit 214 and a primary rear-axle modulator, which in this case modulates the first service brake pressure pB1 at the first service brake pressure connection 232.1 and the second service brake pressure connection 232.2 on a side-specific basis. This means that both the first and the second rear axle HA1, HA2 are braked equally, but a separate pressure is output on the left and on the right for the vehicle 300. The primary electronic brake control unit 214 or the central module is connected via an electrical line to the second primary service brake pressure modulator 236, which is configured here as a primary front-axle modulator. In the embodiment shown here, the second primary service brake pressure modulator 236 does not have any inherent intelligence, with the electromagnetic valves that are provided there in a known manner being switched directly by the primary electronic brake control unit 214 via the service brake signals SigB. Depending on the service brake signals SigB, a second service brake pressure pB1 is modulated at the front axle VA on an axle-specific basis, because the second primary service brake pressure modulator 236 is configured here as a single-channel modulator. To achieve a wheel-specific braking action, the electronically controllable pneumatic brake system 200 in the embodiment shown here has first and second ABS valves 238*a*, 238*b*, which are controlled in a known manner by the primary electronic brake control unit 214. For this purpose, the primary electronic brake control unit 214 also receives wheel rotational speed signals from first and second wheel rotational speed sensors 239*a*, 239*b* at the front axle VA. Wheel rotational speed sensors 239*c*, 239*d*, 239*e*, 239*f* are also provided at the first and second rear axles HA1, HA2. All of the wheel rotational speed sensors 239*a*-239*f* have a direct wired connection to the primary electronic brake control unit 214 and provide wheel rotational speed signals thereto. The primary electronic brake control unit 214 is connected via the vehicle bus 216 to the vehicle control unit for autonomous driving 218.

The primary electronic brake control unit 214 and the first primary service brake pressure modulator 224, that is, the central module as a whole, is supplied with electrical energy by the first voltage source 222. During normal operation, the primary electronic brake control unit 214 receives maneuver-related braking data, in particular braking demand signals, trajectory data and the like, from the vehicle control unit for autonomous driving 218, and from these determines the service brake pressure pB1, pB2 that is to be provided in each case for individual axles or wheels. At the first and second rear axles HA1, HA2, the central module may correspondingly modulate the first service brake pressure pB1 directly; at the front axle VA, the central module provides the brake signals SigB to the second primary service brake pressure modulator 236 in order to correspondingly switch valves and modulate the second service brake pressure pB2 there. If wheel slip then occurs, the central module can react directly at the rear axles HA1, HA2 and can switch the first and second ABS valves 238*a*, 238*b* at the front axle VA.

The secondary electronic brake control unit 242 is provided as a first redundancy level in the secondary system. The secondary electronic brake control unit 242 is combined here both with the first secondary service brake pressure modulator 250 and with the second secondary service brake pressure modulator 252 to form a module, which may be referred to as a secondary or redundant central module. Whilst the (primary) central module including the primary electronic brake control unit 214 and the first primary service brake pressure modulator 224 is supplied with reservoir pressure pV only from the first compressed-air reservoir 101, because the central module controls only the rear-axle brake circuit, the redundant central module including the secondary electronic brake control unit 242, the first secondary service brake pressure modulator 250 and the second secondary service brake pressure modulator 252 is also connected to the second compressed-air reservoir 102, because the redundant central module also controls the front axle VA.

The redundant central module is likewise connected via the vehicle bus 216 to a vehicle control unit for autonomous driving 218, and receives similar maneuver-related braking data, trajectory data or the like from the vehicle control unit for autonomous driving 218. If the central module is not functioning or is not functioning correctly, the redundant central module can take over the control of the brake system 200.

In the electronically controllable pneumatic brake system 200 shown here, a second redundancy level or human redundancy level is also provided, in which a driver must take action. For this purpose, a braking value transmitter 266 is provided, though this may also be omitted in the case of higher levels of automation. The braking value transmitter 266 is electrically connected both to the primary electronic brake control unit 214 and to the secondary electronic brake control unit 242 and can provide braking value transmitter signals thereto, such that these two electronic control units can also be capable of implementing braking demands that are input manually by a vehicle driver via the braking value transmitter 266. The braking value transmitter 266 is however also connected to the second compressed-air reservoir 102, and receives reservoir pressure pV from the second compressed-air reservoir 102. Actuation of a brake pedal of the braking value transmitter 266 causes a pneumatic braking value transmitter brake pressure pBW to be modulated, which is then likewise provided to the first and second select-high valves 260, 262 such that it can be provided, alternatively to the first and second redundancy brake pressures pBR1, pBR2, at the corresponding first and second redundancy connections 263, 264. That is, if the electronically controllable pneumatic brake system 200 is deenergized but the first and second compressed-air reservoirs 101, 102 are still adequately full, a purely pneumatic and manually modulated braking action can be achieved via the braking value transmitter 266.

The parking brake 1 has a parking brake valve unit 2 and a parking brake control unit 6, wherein the parking brake control unit 6 is connected via the vehicle bus 216 to the vehicle control unit for autonomous driving 218, and from this can receive parking brake signals, for example. However, the primary electronic control unit 214 could also demand such parking brake signals via the vehicle bus 216 in order to park the utility vehicle 300, for example, or use the parking brake 1 as an additional brake or auxiliary brake. Furthermore, the parking brake 1 is connected to a so-called push-pull valve 268, via which, in the embodiment shown here, a demand for ventilating the spring brake cylinders 254*c*-254*f* can also be made by a driver by electrical means. For this purpose, the push-pull valve 268 is also electrically connected to the parking brake control unit 6.

In the embodiment shown, the parking brake 1 includes a relay valve 8, which is illustrated here as being separate and which receives the parking brake pressure pFS, or a parking brake control pressure derived therefrom, from the parking brake valve unit 2. The relay valve 8 can then boost the volume of this pressure and correspondingly transmit same to the spring brake cylinders 254*c*-254*f*. For this purpose, the relay valve 8 may additionally be connected to the first and the second compressed-air reservoir 101, 102 or to the third compressed-air reservoir 103 (see for example FIG. 3). The first service brake pressure pB1 is also provided to the relay valve 8 in order to thus be able to implement an anti-compound function.

If the first secondary working connection 250.1 and the second secondary working connection 252.1 are now ventilated by way of suitable valve switching, the consumption of compressed air in the redundancy level is increased such that the reservoir pressure level falls. Since this relates to the reservoir pressure pV1 of the first compressed-air reservoir 101, the reservoir pressure pV2 of the second compressed-air reservoir 102 and the reservoir pressure pV3 of the (optional) third compressed-air reservoir 103, the level of the reservoir pressure pV decreases overall, such that, when a particular threshold is undershot, the spring force provided in the spring brake cylinders 254*c*-254*f* exceeds the opposing force built up by the parking brake pressure pFS, and the spring brake cylinders 254*c*-254*f* thus engage and brake the vehicle 300.

In the embodiment shown here, a trailer control valve 280 is also provided, which in a known manner has a red and a blue or yellow coupling head and which is likewise connected to the first and the second compressed-air reservoir 101, 102. The trailer control valve 280 is electrically controlled directly from the primary electronic brake control unit 214 and need not necessarily have inherent intelligence. It may also be purely pneumatically controlled from the front-axle brake circuit BK2, and for this purpose is also connected to the second select-high valve 262, specifically to an outlet of the second select-high valve 262, in order to thus receive the second redundancy brake pressure pBR2 or braking value transmitter pressure pBW in order to likewise redundantly brake the trailer. To implement a parking brake function in the trailer, the trailer control valve 280 is also connected to the parking brake 1 and can for example receive parking brake pressure pFS therefrom.

Figure 2:
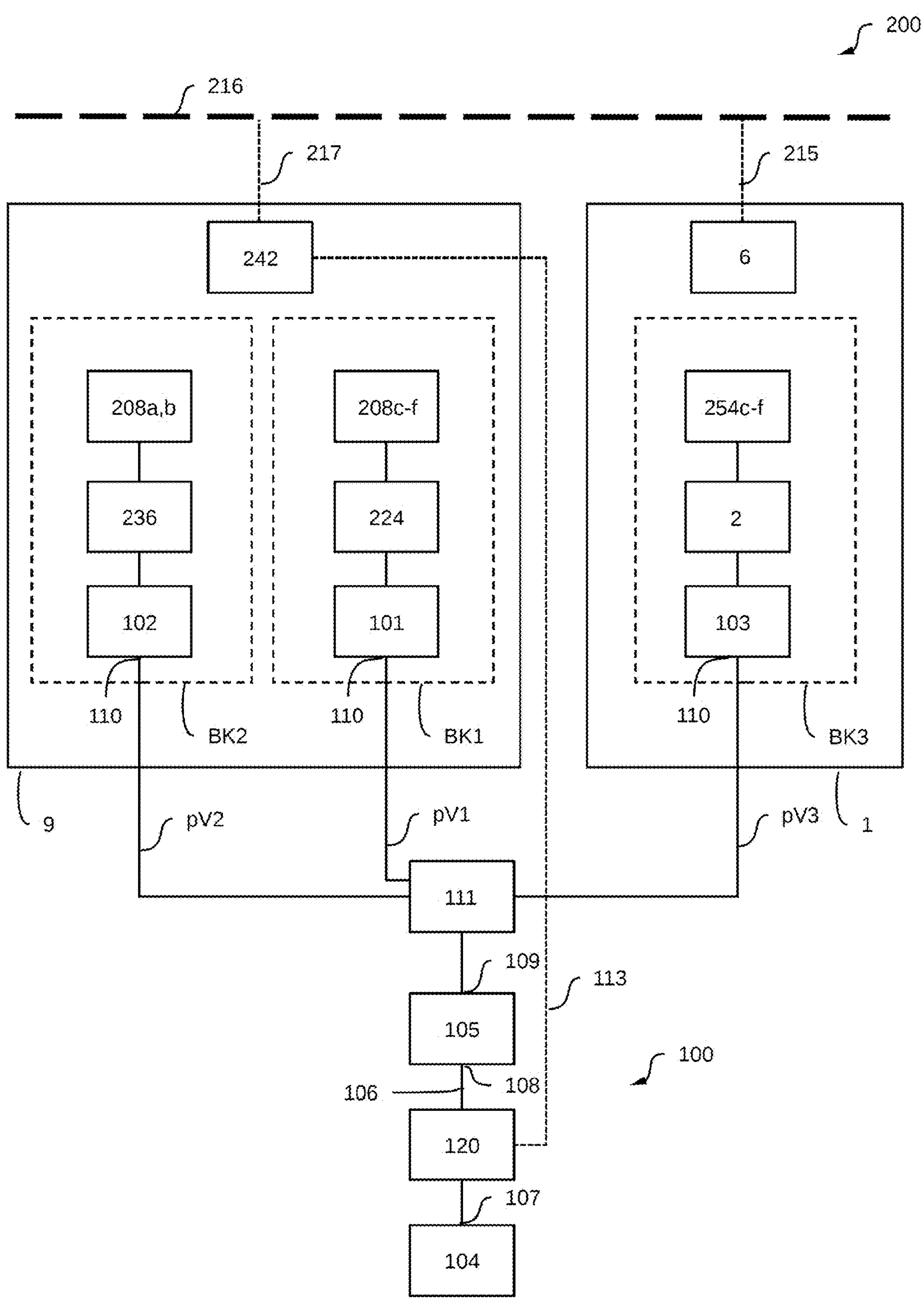
FIG. 2 is a schematic illustration of an embodiment of an electronically controllable pneumatic brake system according to the disclosure.

The embodiment of an electronically controllable pneumatic brake system 200 shown in FIG. 2 is illustrated on the basis of functional blocks. In practice, these blocks may be selectively integrated and combined to form different modules. In this respect, solid lines around the individual elements do not necessarily indicate a separate housing, although this may be provided in some cases.

The electronically controllable pneumatic brake system 200 includes a service brake 9 and a parking brake 1. The service brake 9 is controlled by the secondary electronic brake control unit 242, which is connected via a signal line 217 to the vehicle bus 216. The parking brake 1 is controlled by the parking brake control unit 6, which is connected via the signal line 215 to the vehicle bus 216.

The service brake 9 includes two service brake circuits BK1, BK2. The parking brake 1 includes a parking brake circuit BK3. The first service brake circuit BK1 having the service brake actuators 208*c*-208*f* at the rear axles HA1, HA2 of the utility vehicle 300 and having the first primary service brake pressure modulator 224 is supplied with compressed air via the first compressed-air reservoir 101. The second service brake circuit BK2 having the service brake actuators 208*a*, 208*b* at the front axle VA of the utility vehicle 300 and having the second primary service brake pressure modulator 236 is supplied with compressed air via the second compressed-air reservoir 102. The parking brake circuit BK3 having the spring brake cylinders 254*c-f*, likewise at the rear axles HA1, HA2 of the utility vehicle 300, and having the parking brake valve unit 2 is supplied with compressed air via the third compressed-air reservoir 103.

As constituent parts of the compressed-air supply arrangement 100, the compressed-air reservoirs 101, 102 and 103 are connected to one another via a known multi-circuit protection valve 111, and are fed with compressed air from the air treatment unit 105 via the compressed-air outlet 109. The running compressor 104 delivers a compressed-air flow through a compressed-air delivery line 106 to the air treatment unit 105 in order to provide a supply to the service brake circuits BK1, BK2 and the parking brake circuit BK3. The compressed-air reservoirs (compressed-air tanks) 101, 102, 103 each provide a reservoir pressure pV1, pV2 and pV3 respectively. According to the disclosure, the compressed-air supply arrangement 100 has a delivery-rate limiting device 120 which, in this case, is arranged downstream of the compressed-air outlet 107 of the compressor 104 and upstream of the air treatment unit 105, but which could also be arranged downstream of the air treatment unit 105 and upstream of a point at which the compressed-air delivery line 106 branches to the respective compressed-air reservoirs 101, 102, 103. The delivery-rate limiting device 120 includes a switchable valve unit 130-138 for limiting the delivery rate (compressed-air delivery rate) of the compressor 104. By limiting the delivery rate—with sufficient (simultaneous) consumption of compressed air by the electronically controllable pneumatic brake system 200, preferably by actuation of the service brake 9—a limitation of the reservoir pressure pV1, pV2, pV3 (referred to collectively as reservoir pressure pV) can also be achieved. In accordance with a switching signal SigS output by the secondary electronic brake control unit 242 (preferably) or the electronic parking brake control unit 6 via the electrical signal line 113 to the switchable valve unit 130-138, the valve unit 130-138 assumes a first switching position SS1 for the purposes of delivering compressed air or a second position SS2 for the purposes of limiting the delivery rate. Via the second switching position SS2 of the switchable valve unit 130-138, a limitation of the reservoir pressure pV can also be achieved, specifically if, as a compressed-air flow is being delivered into the compressed-air reservoirs 101, 102, 103, a sufficiently large quantity of air is (simultaneously) extracted (consumption of compressed air) from the compressed-air reservoirs 101, 102, 103, for example by (repeated) actuation of the service brake 9. Embodiments of the switchable valve unit 130-138 and the switching positions SS1, SS2 will be described in detail below.

Figure 3:
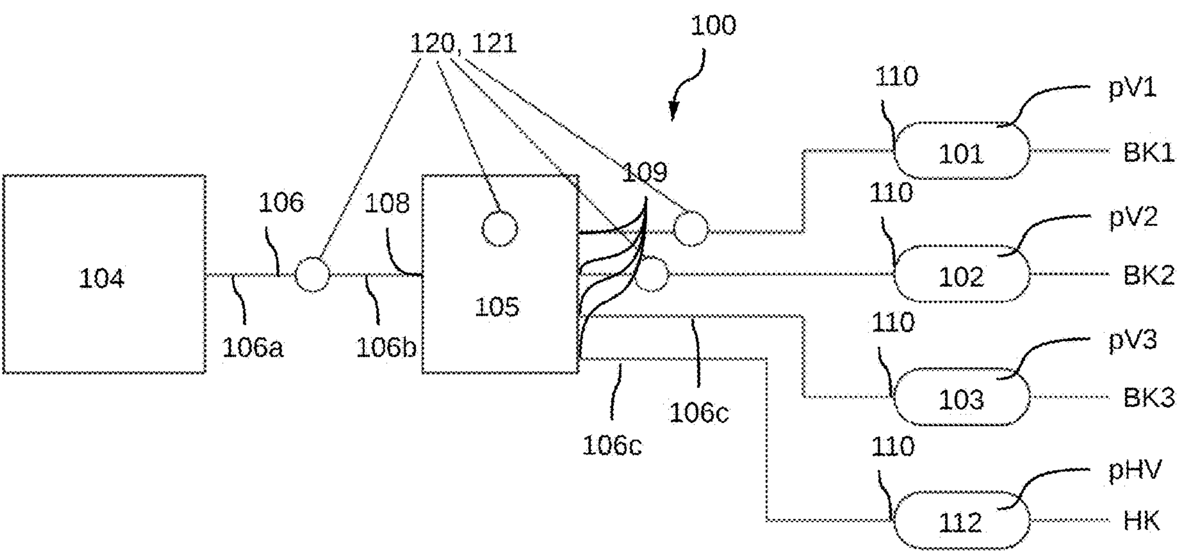
FIG. 3 is a schematic illustration of a compressed-air supply arrangement according to the disclosure, with different possible positions of the delivery-rate limiting device.

FIG. 3 shows a compressed-air supply arrangement 100 for supplying compressed air to an electronically controllable pneumatic brake system 200 of a utility vehicle 300. The compressed-air supply arrangement 100 has a compressor 104 for generating compressed air, an air treatment unit 105 for treating compressed air that is delivered by the compressor 104, and at least one first, second and third compressed-air reservoir 101, 102, 103 for providing respective reservoir pressures pV1, pV2 and pV3. The compressed-air reservoirs 101, 102, 103, which are configured as compressed-air tanks, are typically connected to one another via a multi-circuit protection valve known per se, such that the common reservoir pressure level is referred to collectively as the reservoir pressure pV. The compressed-air reservoir 101, 102, 103 is connected via the compressed-air delivery line 106 to a compressed-air outlet 107 of the compressor 104. The air treatment unit 105 is arranged upstream of the compressed-air reservoirs 101, 102, 103, 112. According to the disclosure, at least one delivery-rate limiting device 120, 121 is provided, which includes a switchable valve unit 130-137, 151 (see FIGS. 3-11) and serves for limiting the compressed-air flow that is delivered by the compressor 104 through the compressed-air delivery line 106 and its line portions 106*a*, 106*b*, 106*c* to the compressed-air reservoirs 101, 102, 103, 112. The switchable valve unit 130-137, 151 is configured to be switched, via a switching signal SigS received from the secondary electronic brake control unit 242, in the event of a fault of the electronically controllable pneumatic brake system 200.

Via the first compressed-air reservoir 101, the compressed-air supply arrangement 100 supplies compressed air to the first service brake circuit BK1 having service brake actuators 208*c*-208*f* at the rear axle HA of the utility vehicle 300. Furthermore, via the second compressed-air reservoir 102, the compressed-air supply arrangement 100 supplies compressed air to the second service brake circuit BK2 having the service brake actuators 208*a*, 208*b* at the front axle VA of the utility vehicle 300. Additionally, via the third compressed-air reservoir 103, the compressed-air supply arrangement 100 supplies compressed air to a third brake circuit BK3, specifically the parking brake circuit. Compressed air is also supplied to an auxiliary compressed-air circuit HK, for example for the air suspension system of the utility vehicle, the air suspension system of the driver's cab, the transmission controller or pneumatically actuatable vehicle doors (in the case of buses) and other pneumatic auxiliary functions of the utility vehicle 300, via the fourth compressed-air reservoir 112.

Figure 9:
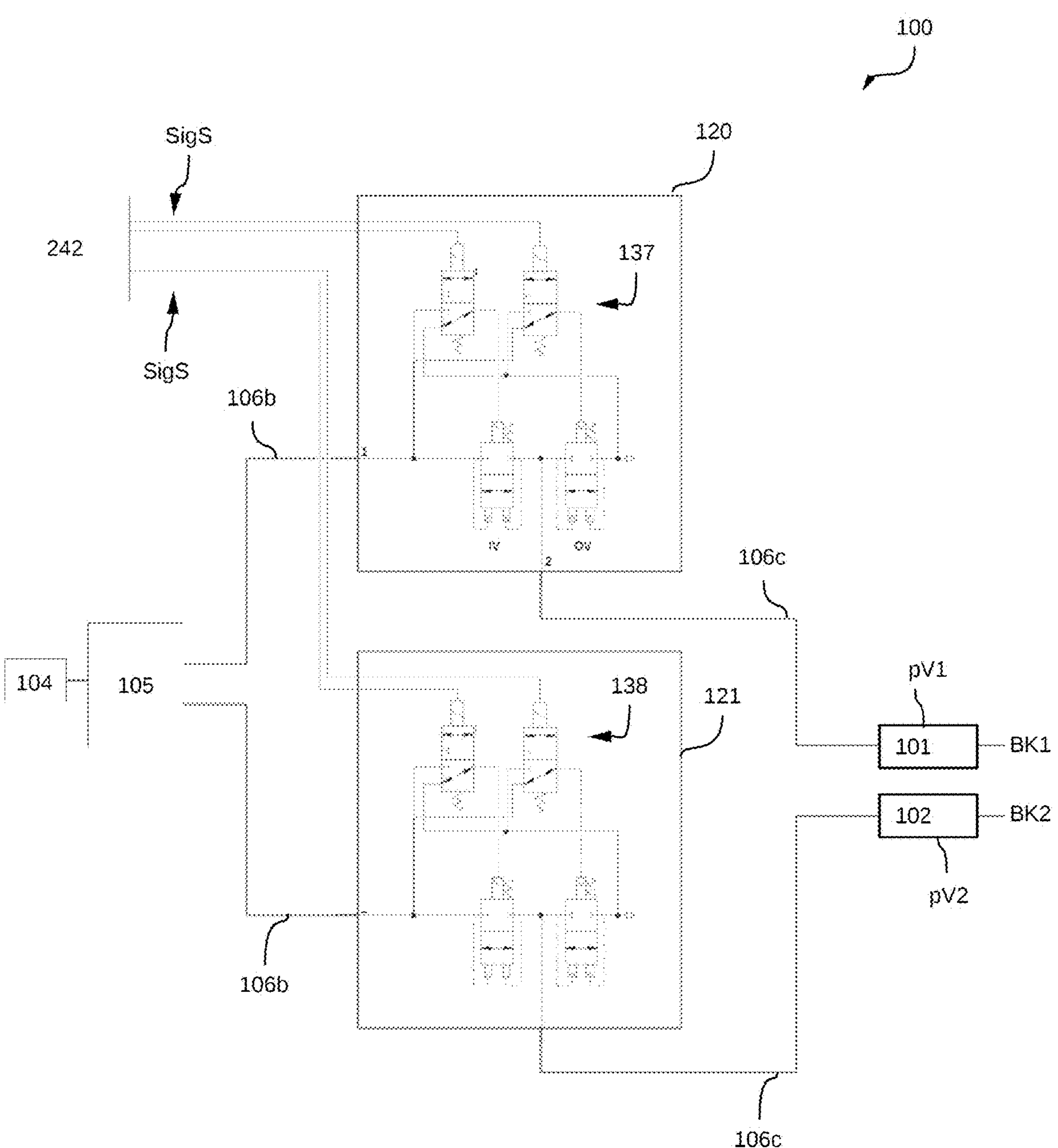
FIG. 9 is a schematic illustration, using graphical symbols, of an embodiment of the compressed-air supply arrangement according to the disclosure having two delivery-rate limiting devices configured as ABS valve units.

The delivery-rate limiting device 120, 121 may be arranged at various positions in the compressed-air supply arrangement 100, in particular at the four different positions illustrated in FIG. 3. The switchable valve unit 130-137 of the delivery-rate limiting device 120, 121 may be arranged upstream of a compressed-air inlet 108 of the compressed-air treatment unit 105 (left-hand position in FIG. 3) or integrated into the air treatment unit 105 (second position from the left in FIG. 3). The air treatment unit 105 is arranged upstream of the first compressed-air reservoir 101, of the second compressed-air reservoir 102 and of the third compressed-air reservoir 103. A switchable valve unit 130-137 (see FIGS. 4-7) of a delivery-rate limiting device 120, 121 may be arranged downstream of a compressed-air outlet 109 of the air treatment unit 105 and upstream of a compressed-air inlet 110 of the first compressed-air reservoir 101. Additionally or alternatively, the switchable valve unit 130-137 of a delivery-rate limiting device 120, 121 may be arranged downstream of the compressed-air outlet 109 and upstream of the compressed-air inlet 110 of the second compressed-air reservoir 102 (see the two right-hand positions in FIG. 3). In particular, each embodiment of the delivery-rate limiting device 120, 121 described in the following FIGS. 4-7 can be arranged at each of the positions shown in FIG. 3, as is also shown in FIGS. 8 and 9.

By limiting the delivered compressed-air flow, the delivery-rate limiting device 120, 121 (indirectly) also reduces the reservoir pressure pV that is available for generating a parking brake pressure pFS for pressurizing a spring brake cylinder 254*c-f* of the parking brake 1. This limitation of the reservoir pressure pV is achieved in that the delivery-rate limiting device 120, 121 prevents a compressed-air flow that is delivered by the compressor 104 from entering one (or more) of the compressed-air reservoirs 101, 102, 103 and preventing or slowing the decrease of the reservoir pressure pV, such as is desired for the engagement of the parking brake 1, owing to replenishing delivery by the compressor 104 (in the absence of, or in the case of insufficient, consumption of compressed air), and does so in particular even whilst the compressor 104 is (still) running.

Figure 4:
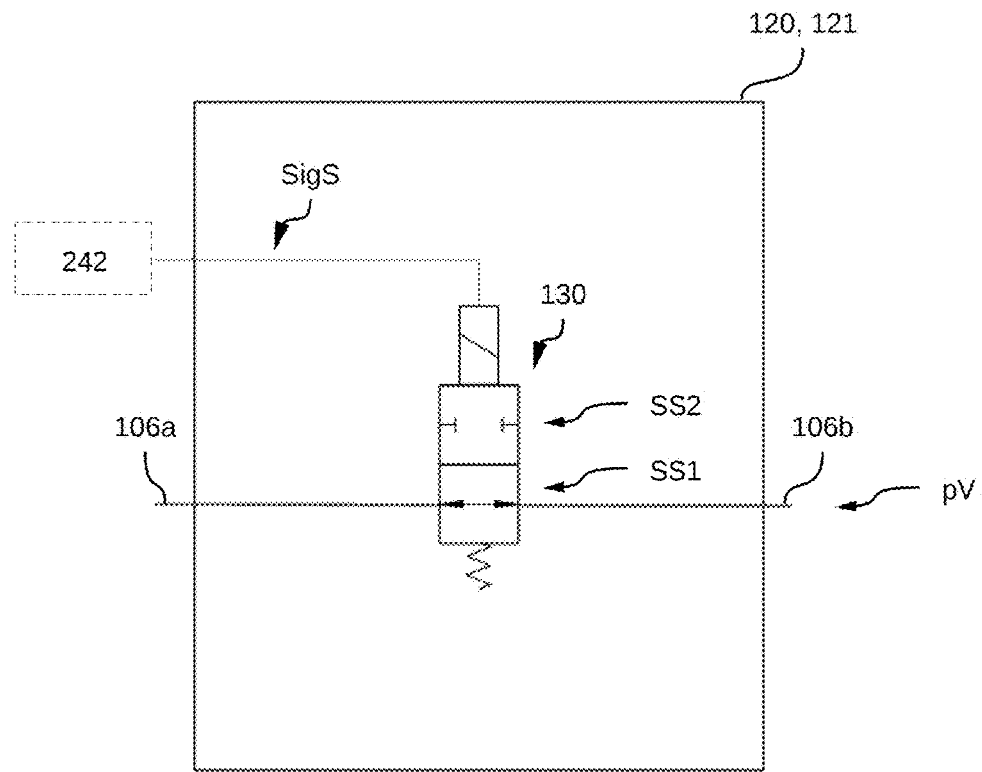
FIG. 4 is a schematic illustration, using graphical symbols, of a further embodiment of a delivery-rate limiting device in the form of a shut-off valve.

In FIG. 4, the switchable valve unit 130 of the delivery-rate limiting device 120, 121 is configured as a switchable shut-off valve, specifically as a switchable electromagnetic 2/2 directional valve (solenoid valve). In accordance with the switching signal SigS output by the secondary electronic brake control unit 242, the valve unit 130 can interrupt the compressed-air flow delivered by the compressor 104 and thus limit the reservoir pressure pV. In a first switching position SS1 for delivering compressed air, the valve unit 130 is deenergized and allows delivered compressed air to pass through the line portion 106*a* of the compressed-air delivery line 106 to the line portion 106*d*. The line portion 106*b* may be connected to a compressed-air inlet 108 of the compressed-air treatment unit 105 or directly to a compressed-air inlet 110 of the compressed-air reservoirs 101, 102, 103. In the second switching position SS2, the provided reservoir pressure pV is reduced in relation to the reservoir pressure pV that is provided in a first switching position SS1. The switchable valve unit 130 is thus configured to shut off the compressed-air delivery line 106 on the basis of the switching signal SigS received from the secondary electronic brake control unit 242.

Figure 5:
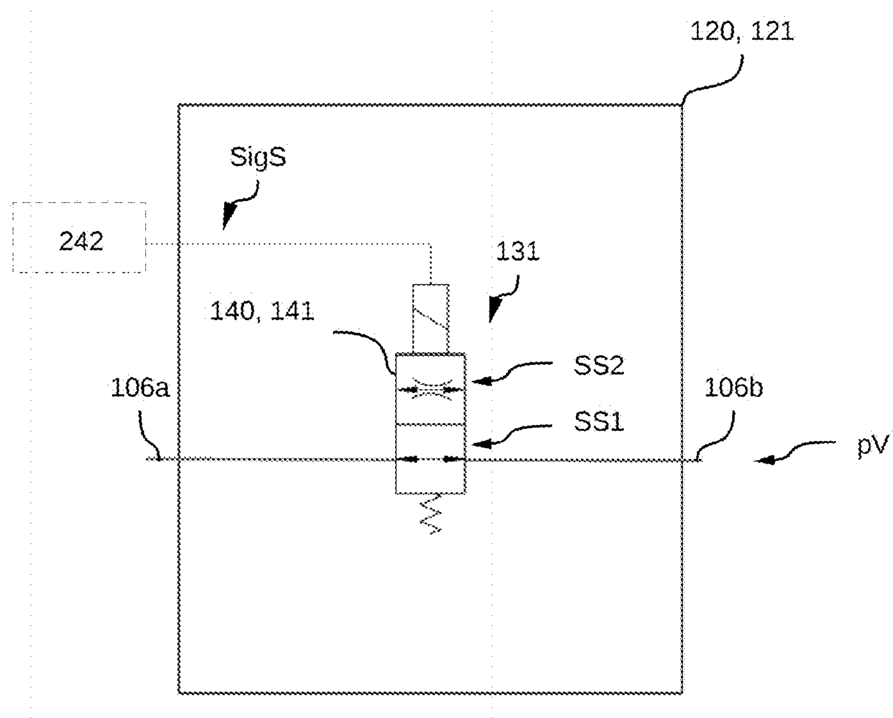
FIG. 5 is a schematic illustration, using graphical symbols, of a further embodiment of a delivery-rate limiting device having a throttling portion.

In the embodiment according to FIG. 5, the switchable valve unit 131 of the delivery-rate limiting device 120, 121 is configured as a switchable valve, specifically as a switchable electromagnetic 2/2 directional valve (solenoid valve), wherein the valve has a flow-rate reduction portion 140 configured as a throttling portion 141 (in the form of a nozzle). The throttling portion 141 is in this case part of the movable valve element of the valve unit 131, specifically in the form of a throttle-like passage opening. By contrast to the embodiment in FIG. 4, the compressed-air flow delivered by the compressor 104 is not completely shut off but is reduced by the throttling portion 141 in order to limit, specifically in order to reduce, the reservoir pressure pV. The reservoir pressure pV decreases if the consumption of compressed air exceeds the (reduced) delivered compressed-air flow rate. The throttling portion leads to a pressure loss and thus to a lowering of the pressure across the throttling portion, whereby the provided reservoir pressure pV is reduced. The throttling effect is significantly determined by the nominal diameter of the throttling portion 141, wherein a relatively small nominal diameter leads to a greater pressure loss and limits the reservoir pressure pV more intensely (that is, to a lower pressure level). The switchable valve unit 131 is thus configured to connect the compressed-air delivery line 106, specifically the line portions 106*a*, 106*b*, to a flow-rate reduction portion 140 (throttling portion 141) of the delivery-rate limiting device 120, 121 on the basis of the switching signal SigS received from the secondary electronic brake control unit 242. Here, in the second switching position SS2, the line portion 106*a* of the compressed-air delivery line 106 is connected to an inlet end of the flow-rate reduction portion 140 (throttling portion 141), and the line portion 106*b* of the compressed-air delivery line 106 is connected to an outlet end of the flow-rate reduction portion 140.

Figure 6:
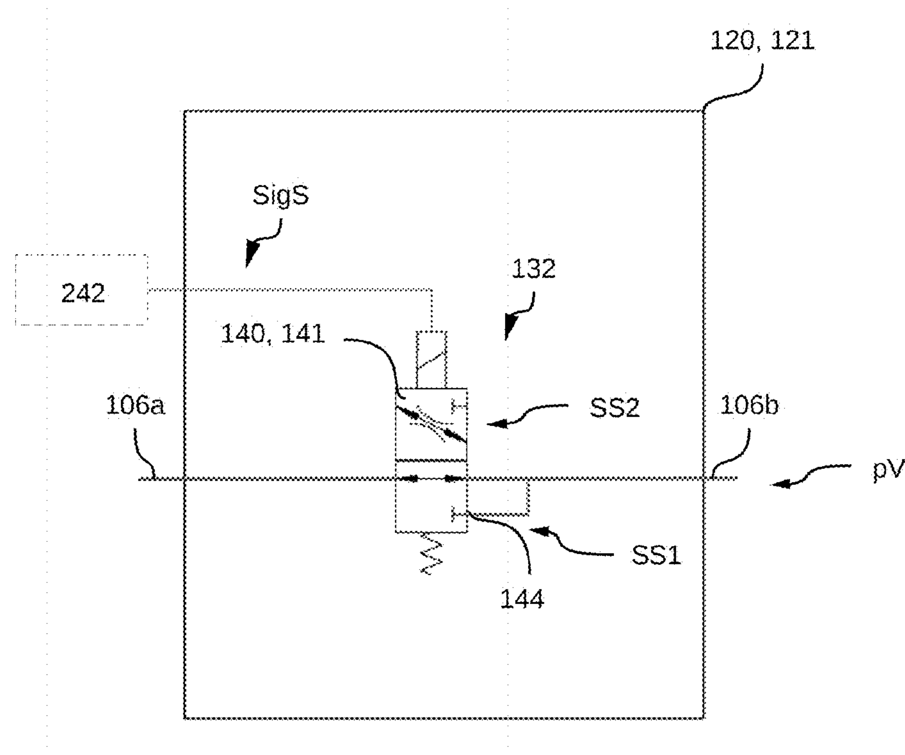
FIG. 6 is a schematic illustration, using graphical symbols, of a further embodiment of a delivery-rate limiting device having a throttling portion.
Figures 7, 8:
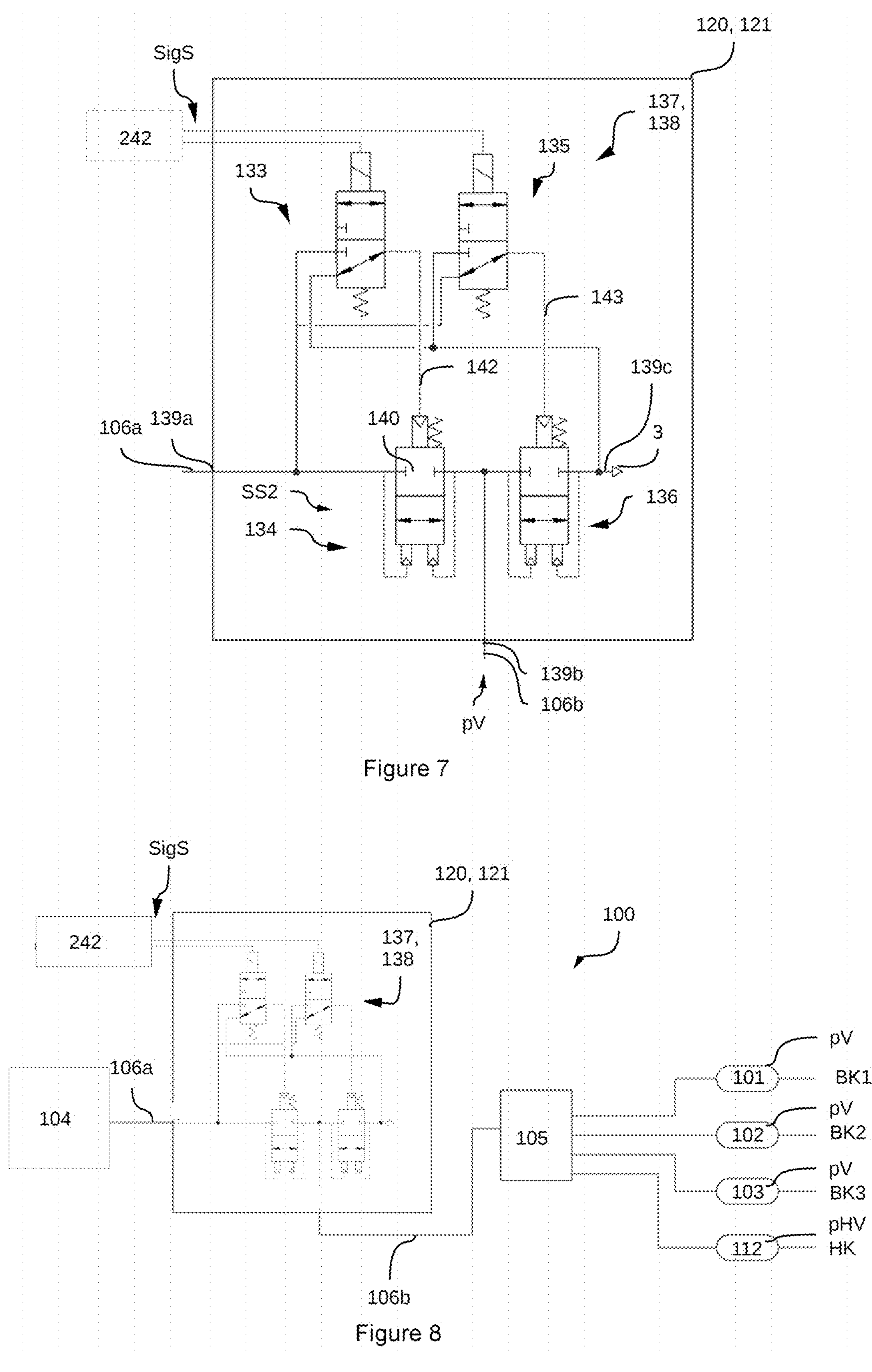
FIG. 7 is a schematic illustration, using graphical symbols, of a further embodiment of a delivery-rate limiting device in the form of an ABS valve unit.
FIG. 8 is a schematic illustration, using graphical symbols, of an embodiment of the compressed-air supply arrangement according to the disclosure having a delivery-rate limiting device configured as an ABS valve unit.

The embodiment according to FIG. 6 is a variant of the embodiment according to FIG. 5. The switchable valve unit 132 of the delivery-rate limiting device 120, 121 is configured as a switchable valve, specifically as a switchable electromagnetic 3/2 directional valve (solenoid valve), wherein the valve has a flow-rate reduction portion 140 configured as a throttling portion 141 (in the form of a nozzle). The throttling portion 141 is configured here as a line portion of the valve in the valve housing, which in a second switching position SS2 is connectable to a valve outlet 144 of the 3/2 directional valve. The valve unit 132 otherwise functions in the same way as the valve unit 131.

In the embodiment according to FIG. 7, the switchable valve unit of the delivery-rate limiting device 120, 121 is configured as a switchable ABS valve unit 137, 138. A first valve connection 139*a* of the switchable ABS valve unit 137, 138 is connectable via the line portion 106*a* selectively to a compressed-air outlet 107 of the compressor 104 or to a compressed-air outlet 109 of the air treatment unit 105, depending on the position of the delivery-rate limiting device 120, 121 in the compressed-air supply arrangement 100. A second valve connection 139*b* of the switchable ABS valve unit 137, 138 is connectable via the line portion 106*b* to a compressed-air inlet 108 of the air treatment unit 105 or directly to a compressed-air inlet 110 of a compressed-air reservoir 101, 102, 103, depending on the position of the delivery-rate limiting device 120, 121 in the compressed-air supply arrangement 100. A third valve connection 139*c* of the switchable ABS valve unit 137, 138 is connected to a vent 3. The ABS valve unit 137, 138, which is known per se, is thus used firstly for limiting a flow rate and thus for limiting the reservoir pressure pV. Secondly, a compressed-air reservoir 101, 102, 103 can be ventilated via the ABS valve unit 137, 138.

The switchable ABS valve unit 137, 138 includes a pneumatically switchable inlet valve 134, a pneumatically switchable outlet valve 136, an electromagnetic inlet valve 133, and an electromagnetic outlet valve 135. Firstly, via the 2/2 directional inlet valve part of the ABS valve unit, which includes the pneumatically switchable inlet valve 133 and the electromagnetic inlet valve 134, in a second switching position SS2, the compressed-air flow delivered by the compressor can be shut off. Secondly, via the 2/2 directional outlet valve part of the ABS valve unit, which includes the pneumatically switchable outlet valve 136 and the electromagnetic outlet valve 135, the compressed-air reservoir (compressed-air reservoir accumulator, preferably compressed-air tank) can be ventilated selectively, in particular in accordance with the switching signal received from a (secondary) electronic brake control unit (242) of the brake system (200). In the switching position of the pneumatically switchable outlet valve 136 as shown in FIG. 7, the compressed-air reservoirs 101, 102, 103 that are connectable via the second valve connection 139*b* are not ventilated, with the present reservoir pressure pV rather being held.

The electromagnetic inlet and outlet valves 133, 135 are switchable via switching signals SigS received from the secondary electronic brake control unit 242. The electromagnetic inlet valve 133 is connected via a first control line 142 to a pneumatic control connection of the pneumatically switchable inlet valve 134. The electromagnetic outlet valve 135 is connected via a second control line 143 to a pneumatic control connection of the pneumatically switchable outlet valve 136. When deenergized, the two electromagnetic valves 133, 135 are situated in the switching position shown in FIG. 7, in which the first control line 142 is connected via the electromagnetic inlet valve 133 to the vent 3. The pneumatic control connection of the pneumatically switchable outlet valve 136 can be pressurized with the delivery pressure which originates from the first valve connection 139*a* and which is provided by the compressor 104 via the line portion 106*a* of the compressed-air delivery line 106. In the switching position shown in FIG. 7, no delivery pressure prevails at the first valve connection 139*a*. Via a feedback line, however, when a delivery pressure is provided by the compressor 104, the pneumatically switchable inlet valve 134 is automatically switched into the switching position that is not shown in FIG. 7, such that it is then in the pass-through position. The delivered compressed-air flow can then flow from the first valve connection 139*a* to the second valve connection 139*b* and onward into a connected compressed-air reservoir 101, 102, 103. Since the second control line 143 is pressurized with this same delivery pressure, the feedback line at the pneumatically switchable outlet valve 136 does not change the switching position, such that the vent 3 remains shut off. By contrast, if the electromagnetic outlet valve 135 is energized, pressure is no longer modulated in the second control line 143, such that, if the pneumatically switchable inlet valve 134 is open, the pneumatically switchable outlet valve 136 automatically also switches and thus connects the second valve outlet 139*b* to the vent 3, whereby the compressed-air reservoirs 101, 102, 103 are ventilated. This ventilation can be ended by deenergizing the electromagnetic outlet valve 135 or by energizing the electromagnetic inlet valve 133. In this way, the ABS valve unit 137, 138 is used to limit the delivery rate and thus preferably also to limit the reservoir pressure pV.

In the embodiment according to FIG. 8, a delivery-rate limiting device 120, 121 configured as an ABS valve unit 137, 138 is arranged, by way of example, in the compressed-air delivery line 106 upstream of the air treatment unit 105.

In the embodiment according to FIG. 9, a delivery-rate limiting device 120 configured as an ABS valve unit 137 is arranged downstream of the air treatment unit 105 and upstream of the first compressed-air reservoir 101 in the compressed-air delivery line 106 between the line portions 106*b* and 106*c* for the purposes of limiting the delivery rate into the compressed-air reservoir 101, wherein the compressed-air reservoir 101 with the reservoir pressure pV1 can be ventilated via the ABS valve unit 137. Similarly, a delivery-rate limiting device 121 configured as an ABS valve unit 138 is arranged downstream of the air treatment unit 105 and upstream of the second compressed-air reservoir 102 in the compressed-air delivery line 106 between the line portions 106*b* and 106*c* for the purposes of limiting the delivery rate into the compressed-air reservoir 102, wherein the compressed-air reservoir 102 with the reservoir pressure pV2 can be ventilated via the ABS valve unit 138. The levels of the reservoir pressures pV1 and pV2 can thus be limited independently of one another.

Figure 10:
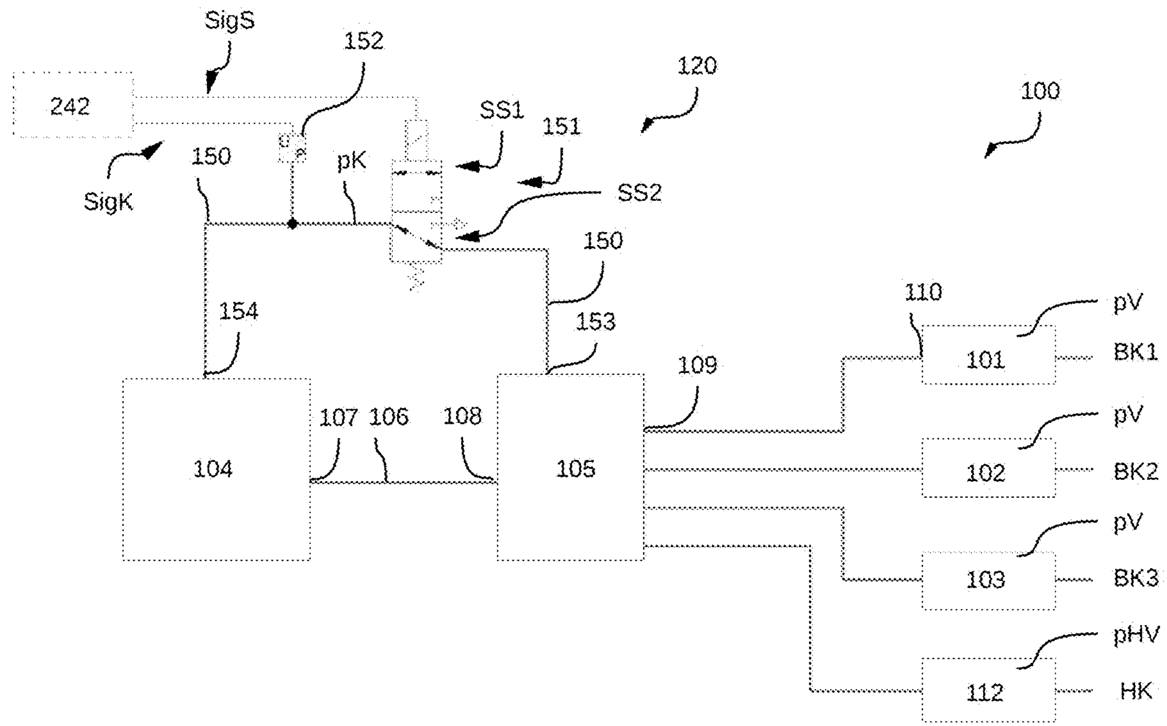
FIG. 10 is a schematic illustration, using graphical symbols, of a first embodiment of the compressed-air supply arrangement according to the disclosure having a delivery-rate limiting device in a compressor control line; and, FIG. 11 is a schematic illustration, using graphical symbols, of a second embodiment of the compressed-air supply arrangement according to the disclosure having a delivery-rate limiting device in a compressor control line.

In the embodiment according to FIG. 10, the air treatment unit 105 is, for the purposes of providing a compressor control pressure pk, connected via a compressor control line 150 to a control unit of the compressor 104. The switchable valve unit 151 of the delivery-rate limiting device 120 is arranged in the compressor control line 150. The switchable valve unit 151 is configured such that, in the first switching position SS1, it connects the control pressure inlet 154 of the compressor 104 to the control pressure outlet 153 of the air treatment unit 105. In the second switching position SS2, the compressor control line 150 is ventilated. In this embodiment, the compressor 104 delivers compressed air when the compressor control line 150 is pressurized, and does not deliver compressed air when the compressor control line 150 is ventilated. Via the compressor control line 150, the operating state of the compressor 104 can be controlled such that the compressor 104 delivers less compressed air, or preferably no longer delivers compressed air, if a lowering of the reservoir pressure pV is desired. Preferably, the compressor 104 is separated from the drive by the switching of the clutch if the compressor control pressure pk falls below a particular pressure level.

The pressure sensor 152 serves to detect the compressor control pressure pk in the compressor control line 150 and transmits a corresponding compressor control pressure signal SigK to an electronic brake control unit 242. The pressure sensor 152 is arranged in that compressor control line portion which is connected to the control pressure inlet 154 of the compressor 104. On the basis of the received compressor control pressure signal SigK, the secondary electronic brake control unit 242 outputs a switching signal SigS to the switchable valve unit 151 if a compressor control pressure pk detected by the pressure sensor 152 falls below a specified pressure level. The lowering of the reservoir pressure pV can thus be detected, and replenishing delivery by the compressor 104 can be prevented.

Figure 11:
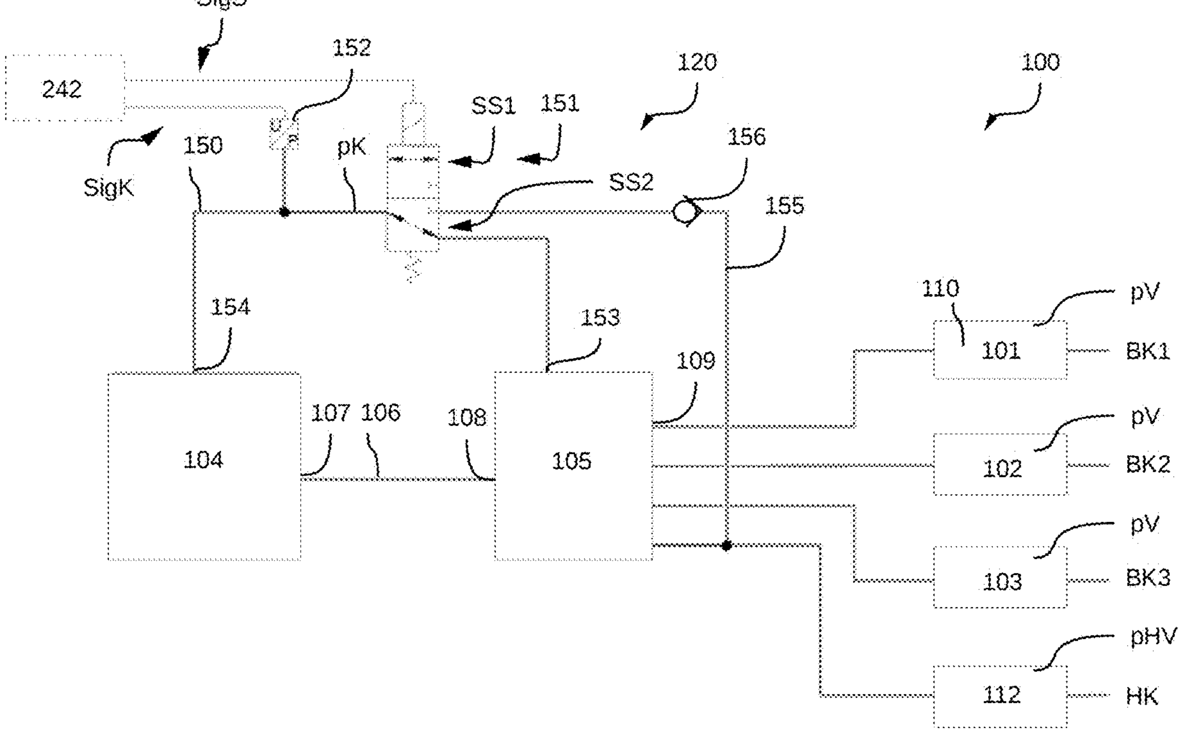

In the embodiment according to FIG. 11, which is an alternative to that in FIG. 10, the switchable valve unit 151 is configured such that, in the first switching position SS1, it connects the control pressure inlet 154 of the compressor 104 to the control pressure outlet 153 of the air treatment unit 105. In the second switching position SS2, the control pressure inlet 154 of the compressor 104 is connected to the auxiliary reservoir pressure pHV in the fourth compressed-air reservoir 112 in order to pressurize the compressor control line 150. In this embodiment, the compressor 104 delivers compressed air when the compressor control line 150 is unpressurized, and does not deliver compressed air when the compressor control line 150 is pressurized. In the second switching position SS2, the control pressure inlet 154 is connected via the redundant compressor control line portion 155 to the auxiliary reservoir pressure pHV. The auxiliary reservoir pressure pHV is provided by the fourth compressed-air reservoir 112 of the auxiliary compressed-air circuit HK of the electronically controllable pneumatic brake system 200. A pressure retaining device for retaining the auxiliary reservoir pressure pHV as a compressor control pressure pK may optionally be provided in the compressor control line portion 155, the pressure retaining device being provided for example by a check valve 156 or an active holding valve.

The illustrated embodiments of the disclosure have the advantage that the engagement of the parking brake 1 is made reliably possible—in particular even when the compressor 104 is running, more particularly even in the event of a fault of the electronically controllable pneumatic brake system 200 in vehicles with relatively high levels of automation—owing to the limitation of the compressed-air delivery rate by the switchable delivery-rate limiting device 120, 121.

It is understood that the foregoing description is that of the preferred embodiments of the invention and that various changes and modifications may be made thereto without departing from the spirit and scope of the invention as defined in the appended claims.

REFERENCE SIGNS

Part of the Description

1 Parking brake
2 Parking brake valve unit
3 Vent
4 First supply connection of the parking brake valve unit
5 Second supply connection of the parking brake valve unit
6 Parking brake control unit
8*a* First spring accumulator connection
8*b* Second spring accumulator connection
8 Relay valve
9 Service brake
HA1 First rear axle
HA2 Second rear axle
VA Front axle
BK1, BK2 Brake circuit, specifically service brake circuit
BK3 Brake circuit, specifically parking brake circuit
HK Auxiliary compressed-air circuit
100 Compressed-air supply arrangement
101 First compressed-air reservoir
102 Second compressed-air reservoir
103 Third compressed-air reservoir
104 Compressor
105 Air treatment unit
106 Compressed-air delivery line
106*a-c* Line portion of the compressed-air delivery line
107 Compressed-air outlet of the compressor
108 Compressed-air inlet of the air treatment unit
109 Compressed-air outlet of the air treatment unit
110 Compressed-air inlet of the compressed-air reservoir
111 Multi-circuit protection valve
112 Fourth compressed-air reservoir
113 Signal line
120, 121 Delivery-rate limiting device
130-132 Switchable valve unit
133 Electromagnetic inlet valve
134 Pneumatically switchable inlet valve
135 Electromagnetic outlet valve
136 Pneumatically switchable outlet valve
137, 138 Switchable ABS valve unit
139*a* First valve connection of the ABS valve
139*b* Second valve connection of the ABS valve
139*c* Third valve connection of the ABS valve
140 Flow-rate reduction portion
141 Throttling portion
142 First control line
143 Second control line
144 Valve outlet
150 Compressor control line
151 Switchable valve unit
152 Pressure sensor
153 Control pressure outlet of the air treatment unit
154 Control pressure inlet of the compressor

155 Redundant compressor control line portion
156 Check valve
200 Electronically controllable pneumatic brake system
208*c*-208*f* Service brake actuators
214 (Primary) electronic brake control unit
215 Signal line
216 Vehicle BUS
217 Signal line
218 Vehicle control unit for autonomous driving
222 First voltage source
224 First primary service brake pressure modulator (primary rear-axle modulator)
232.1 First service brake pressure connection
232.2 Second service brake pressure connection
236 Second primary service brake pressure modulator (primary front-axle modulator)
236.1 Third service brake pressure connection
236.2 Fourth service brake pressure connection
238*a* First ABS valve
238*b* Second ABS valve
242 (Secondary) electronic brake control unit
246 Second voltage source
250 First secondary service brake pressure modulator
250.1 First secondary working connection
252 Second secondary service brake pressure modulator
252.1 Second secondary working connection
254*c*-254*f* Spring brake cylinders
260 First select-high valve
262 Second select-high valve
263 First redundancy connection
264 Further redundancy connection
266 Braking value transmitter
268 Push-pull valve
280 Trailer control valve
300 Utility vehicle
PV Reservoir pressure
pV1, pV2 Reservoir pressure
pV3 Reservoir pressure
pk Compressor control pressure
PHV Auxiliary reservoir pressure
pB1 First service brake pressure
pB2 Second service brake pressure
pFS Parking brake pressure
pBR1 First redundancy brake pressure
pBR2 Second redundancy brake pressure
pBW Braking value transmitter brake pressure
SigB Service brake signal
SigS Switching signal
SigK Compressor control pressure signal
SS1 First switching position (for the delivery of compressed air)
SS2 Second switching position (for limiting the delivery rate)

The invention claimed is:

1. A compressed-air supply arrangement for supplying compressed air to an electronically controllable pneumatic brake system of a utility vehicle, the compressed-air supply arrangement comprising:

a compressor for generating compressed air having a compressed-air outlet;

an air treatment unit for treating compressed air delivered by said compressor;

at least one compressed-air reservoir for providing a reservoir pressure for pressurizing at least one spring brake cylinder of a parking brake of the brake system with compressed air, wherein said at least one compressed-air reservoir is connected via at least one compressed-air delivery line to said compressed-air outlet of said compressor; and, at least one delivery-rate limiting device for limiting compressed-air flow delivered by said compressor through the at least one compressed-air delivery line to said at least one compressed-air reservoir, said at least one delivery-rate limiting device having a switchable valve unit, wherein said switchable valve unit is configured to be switched, in an event of a fault of the brake system, via a switching signal received from an electronic brake control unit of the brake system.

2. The compressed-air supply arrangement of claim 1, wherein said switchable valve unit, in a switching position for limiting a delivery rate, at least partially prevents a replenishing delivery of compressed air into said at least one compressed-air reservoir by said compressor.

3. The compressed-air supply arrangement of claim 1, wherein the reservoir pressure provided by said at least one compressed-air reservoir when said switchable valve unit is in a second switching position is reduced in relation to the reservoir pressure provided by virtue of compressed air being delivered via said compressor into said at least one compressed-air reservoir when said switchable valve unit is in a first switching position.

4. The compressed-air supply arrangement of claim 1, wherein said air treatment unit is arranged upstream of said at least one compressed-air reservoir; and, said switchable valve unit is arranged upstream of a compressed-air inlet of said air treatment unit or is integrated into said air treatment unit.

5. The compressed-air supply arrangement of claim 1, wherein:

said air treatment unit is arranged upstream of said at least one compressed-air reservoir;

said at least one compressed-air reservoir includes a first compressed-air reservoir of a first service brake circuit of the brake system, for supplying compressed air to at least one first service brake actuator at a first axle of the utility vehicle and further includes a second compressed-air reservoir of a second service brake circuit of the brake system for supplying compressed air to at least one second service brake actuator at a second axle of the utility vehicle;

said air treatment unit is arranged upstream of said first compressed-air reservoir and said second compressed-air reservoir;

said at least one delivery-rate limiting device includes a first delivery-rate limiting device and a second delivery-rate limiting device;

wherein at least one of:

said switchable valve unit of said first delivery-rate limiting device is arranged downstream of a compressed-air outlet of said air treatment unit and upstream of a compressed-air inlet of said first compressed-air reservoir; and, said switchable valve unit of said second delivery-rate limiting device is arranged downstream of the compressed-air outlet of said air treatment unit and upstream of a compressed-air inlet of said second compressed-air reservoir.

6. The compressed-air supply arrangement of claim 1, wherein said switchable valve unit is configured to at least one of shut off said compressed-air delivery line and to connect at least one line portion of said compressed-air delivery line to a flow-rate reduction portion of the delivery-rate limiting device, on a basis of the switching signal received from the electronic brake control unit of the brake system.

7. The compressed-air supply arrangement of claim 6, wherein said flow-rate reduction portion is configured as a throttling portion.

8. The compressed-air supply arrangement of claim 1, wherein said switchable valve unit is configured as a switchable ABS valve unit; and, wherein a first valve connection of said switchable ABS valve unit is connected to the compressed-air outlet of said compressor, a second valve connection of said switchable ABS valve unit is connected to a compressed-air inlet of said air treatment unit or to said at least one compressed-air reservoir, and a third valve connection of said switchable ABS valve unit is connected to a vent.

9. The compressed-air supply arrangement of claim 8, wherein said switchable ABS valve unit has a pneumatically switchable inlet valve, a pneumatically switchable outlet valve, an electromagnetic inlet valve, and an electromagnetic outlet valve.

10. The compressed-air supply arrangement of claim 1, wherein said air treatment unit is connected, for providing a compressor control pressure, via a compressor control line to a control unit of said compressor, and said switchable valve unit is arranged in said compressor control line.

11. The compressed-air supply arrangement of claim 10, wherein said switchable valve unit is configured:

when in a first switching position, to connect a control pressure inlet of said compressor to a control pressure outlet of said air treatment unit and, when in a second switching position, to ventilate said compressor control line, or, when in a first switching position, to connect the control pressure inlet of said compressor to the control pressure outlet of the air treatment unit and, when in a second switching position, to connect said control pressure inlet of said compressor to an auxiliary reservoir pressure of the brake system.

12. The compressed-air supply arrangement of claim 10, wherein said delivery-rate limiting device includes a pressure sensor for detecting the compressor control pressure in said compressor control line, wherein said pressure sensor is configured to transmit a compressor control pressure signal, which represents said detected compressor control pressure, to the electronic brake control unit of the brake system.

13. An electronically controllable pneumatic brake system for a utility vehicle, the electronically controllable pneumatic brake system comprising:

an electronic control unit;

a compressed-air supply arrangement including a compressor for generating compressed air having a compressed-air outlet, an air treatment unit for treating compressed air delivered by said compressor, and at least one compressed-air reservoir for providing a reservoir pressure for pressurizing at least one spring brake cylinder of a parking brake of the brake system with compressed air, wherein said at least one compressed-air reservoir is connected via at least one compressed-air delivery line to said compressed-air outlet of said compressor; and, said compressed-air supply arrangement further including at least one delivery-rate limiting device for limiting compressed-air flow delivered by said compressor through said at least one compressed-air delivery line to said at least one compressed-air reservoir, said at least one delivery-rate limiting device having a switchable valve unit, wherein said switchable valve unit is configured to be switched, in an event of a fault of the brake system, via a switching signal received from said electronic brake control unit;

the parking brake having the at least one spring brake cylinder configured to be pressurized with compressed air, via the reservoir pressure provided from said at least one compressed-air reservoir, in order to release said parking brake; and, said electronic brake control unit being configured to output the switching signal to said switchable valve unit of said at least one delivery-rate limiting device in an event of a fault of said electronically controllable pneumatic brake system.

14. The electronically controllable pneumatic brake system of claim 13, wherein:

said electronic brake control unit is a secondary electronic brake control unit configured to receive maneuver-related braking data via a vehicle bus from a vehicle control unit for autonomous driving or from a redundant vehicle control unit for autonomous driving; and, said secondary electronic brake control unit is configured to at least partially control at least one service brake circuit of said electronically controllable pneumatic brake system in an event of a fault of a primary electronic brake control unit of said electronically controllable pneumatic brake system.

15. The electronically controllable pneumatic brake system of claim 13, wherein said parking brake includes a parking brake valve unit, to which the reservoir pressure is supplied, for providing a parking brake pressure with which the at least one spring brake cylinder is configured to be pressurized; and, wherein the reservoir pressure is provided by:

a first compressed-air reservoir of a first service brake circuit of the electronically controllable pneumatic brake system for supplying compressed air to at least one first service brake actuator at a first axle of the utility vehicle; or, a second compressed-air reservoir of a second service brake circuit of the electronically controllable pneumatic brake system for supplying compressed air to at least one second service brake actuator at a second axle of the utility vehicle; or, a third compressed-air reservoir of a parking brake circuit for supplying compressed air to the parking brake valve unit; or, the air treatment unit directly for treating the compressed air delivered by the compressor.

16. A method for engaging a parking brake of an electronically controllable pneumatic brake system of a utility vehicle, comprising the following steps:

detecting a fault in the electronically controllable pneumatic brake system, wherein the detected fault prevents a parking brake from being engaged via a switching operation of a parking brake valve unit of the parking brake such that at least one spring brake cylinder of the parking brake is ventilated;

outputting a switching signal via an electronic brake control unit of the brake system to a switchable valve unit of at least one delivery-rate limiting device of a compressed-air supply arrangement for providing a supply to the electronically controllable pneumatic brake system, wherein the switching signal has an effect that compressed-air flow delivered by a compressor to at least one compressed-air reservoir of the electronically controllable pneumatic brake system is limited; and, lowering a reservoir pressure for the pressurization of the at least one spring brake cylinder of the parking brake of the electronically controllable pneumatic brake system by consuming compressed air in at least one service brake circuit or parking brake circuit of the electronically controllable pneumatic brake system.

17. The method of claim 16, wherein the reservoir pressure is lowered by at least partially ventilating at least one service brake actuator of at least one service brake circuit of the electronically controllable pneumatic brake system one or more times.

18. The method of claim 16, wherein:

the electronically controllable pneumatic brake system includes the compressed-air supply arrangement including the compressor for generating compressed air having a compressed-air outlet, an air treatment unit for treating compressed air delivered by said compressor, and the at least one compressed-air reservoir for providing a reservoir pressure for pressurizing at least one spring brake cylinder of the parking brake of the brake system with compressed air, wherein said compressed-air reservoir is connected via at least one compressed-air delivery line to said compressed-air outlet of said compressor; and, said compressed-air supply arrangement further including the at least one delivery-rate limiting device for limiting the compressed-air flow delivered by said compressor through said at least one compressed-air delivery line to said at least one compressed-air reservoir, said at least one delivery-rate limiting device having the switchable valve unit, wherein said switchable valve unit is configured to be switched, in an event of a fault of the brake system, via the switching signal received from the electronic brake control unit of the brake system;

the electronically controllable pneumatic brake system further including the parking brake having the at least one spring brake cylinder configured to be pressurized with compressed air, via the reservoir pressure provided from said at least one compressed-air reservoir, in order to release said parking brake; and, the electronically controllable pneumatic brake system including the at least one electronic brake control unit configured to output the switching signal to said switchable valve unit of said at least one delivery-rate limiting device in the event of the fault of said electronically controllable pneumatic brake system.

19. A utility vehicle comprising the compressed-air supply arrangement of claim 1.

20. A utility vehicle comprising the electronically controllable pneumatic brake system of claim 13.

21. A utility vehicle comprising an electronic brake control unit configured to perform the method of claim 16.

* * * * *